US007712137B2

(12) United States Patent
Meier

(10) Patent No.: US 7,712,137 B2
(45) Date of Patent: May 4, 2010

(54) CONFIGURING AND ORGANIZING SERVER SECURITY INFORMATION

(75) Inventor: John D. Meier, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1103 days.

(21) Appl. No.: 11/363,142

(22) Filed: Feb. 27, 2006

(65) Prior Publication Data

US 2007/0204346 A1    Aug. 30, 2007

(51) Int. Cl.
G06F 21/00 (2006.01)
H04L 29/06 (2006.01)

(52) U.S. Cl. ........................................ 726/25; 713/152

(58) Field of Classification Search ................ 713/176, 713/155, 175; 726/25, 22, 23, 4, 11, 28; 380/200, 201, 277
See application file for complete search history.

(56) References Cited

U.S. PATENT DOCUMENTS

| 5,107,499 | A | 4/1992 | Lirov |
| 5,446,680 | A | 8/1995 | Sekiya et al. |
| 5,751,949 | A | 5/1998 | Thomson et al. |
| 5,812,780 | A | 9/1998 | Chen et al. |
| 6,067,412 | A | 5/2000 | Blake et al. |
| 6,167,521 | A | 12/2000 | Smith et al. |
| 6,209,101 | B1 | 3/2001 | Mitchem et al. |
| 6,256,773 | B1 | 7/2001 | Bowman-Amuah |
| 6,377,994 | B1* | 4/2002 | Ault et al. ................... 709/229 |
| 6,408,391 | B1 | 6/2002 | Huff et al. |
| 6,457,040 | B1 | 9/2002 | Mizuhara et al. |
| 6,542,993 | B1* | 4/2003 | Erfani ............................ 726/1 |
| 6,584,569 | B2 | 6/2003 | Reshef et al. |
| 6,609,100 | B2 | 8/2003 | Smith |
| 6,631,473 | B2 | 10/2003 | Townsend |
| 6,643,775 | B1 | 11/2003 | Granger |
| 6,668,325 | B1 | 12/2003 | Collberg |
| 6,742,143 | B2 | 5/2004 | Kaler et al. |
| 6,782,425 | B1 | 8/2004 | Germscheid et al. |
| 6,816,886 | B2 | 11/2004 | Elvanoglu et al. |

(Continued)

FOREIGN PATENT DOCUMENTS

WO    9853399    11/1998

(Continued)

OTHER PUBLICATIONS

Adding Application Security. http://www.technicalinfo.net/opinions/opinion024.html, last accessed on Nov. 15, 2005, 2 pages.

(Continued)

Primary Examiner—Gilberto Barron, Jr.
Assistant Examiner—Soheila Davanlou
(74) Attorney, Agent, or Firm—Workman Nydegger

(57) ABSTRACT

A server security schema that can incorporate server security-related expertise into an information model is provided. The novel server security schema component can be applied to an application server, a web server and/or a database server to converge knowledge into securing the server by identifying categories, vulnerabilities, threats, attacks and countermeasures. The novel schema can create a common framework that converges knowledge with respect to any server type. More particularly, the novel server security schema can address server categories including a share, a service, an account, an audit and log, a file and directory, a registry, a protocol, a port, and a patch and update category.

20 Claims, 11 Drawing Sheets

U.S. PATENT DOCUMENTS

| | | | |
|---|---|---|---|
| 6,836,845 B1 | 12/2004 | Lennie et al. | |
| 6,850,985 B1 | 2/2005 | Giloi et al. | |
| 6,915,454 B1 | 7/2005 | Moore et al. | |
| 6,959,393 B2 | 10/2005 | Hollis et al. | |
| 6,971,026 B1 | 11/2005 | Fujiyama | |
| 6,980,927 B2 | 12/2005 | Tracy et al. | |
| 6,981,281 B1 | 12/2005 | LaMacchia et al. | |
| 6,985,946 B1 | 1/2006 | Vasandani et al. | |
| 6,993,448 B2 | 1/2006 | Tracy et al. | |
| 6,996,845 B1 | 2/2006 | Hurst et al. | |
| 7,000,219 B2 | 2/2006 | Barrett | |
| 7,013,395 B1 | 3/2006 | Swiler et al. | |
| 7,032,114 B1 | 4/2006 | Moran | |
| 7,096,502 B1 | 8/2006 | Fox | |
| 7,219,304 B1* | 5/2007 | Kraenzel et al. | 715/755 |
| 7,231,661 B1* | 6/2007 | Villavicencio et al. | 726/4 |
| 7,249,174 B2* | 7/2007 | Srinivasa et al. | 709/223 |
| 7,346,922 B2* | 3/2008 | Miliefsky | 726/3 |
| 7,370,359 B2* | 5/2008 | Hrabik et al. | 726/23 |
| 2002/0007229 A1 | 1/2002 | Hudson | |
| 2002/0078380 A1 | 6/2002 | Lin | |
| 2002/0129264 A1* | 9/2002 | Rowland et al. | 709/224 |
| 2002/0144128 A1 | 10/2002 | Rahman et al. | |
| 2002/0161903 A1 | 10/2002 | Besaw | |
| 2002/0166063 A1* | 11/2002 | Lachman et al. | 713/188 |
| 2003/0005326 A1 | 1/2003 | Flemming | |
| 2003/0014644 A1 | 1/2003 | Burns et al. | |
| 2003/0033516 A1 | 2/2003 | Howard et al. | |
| 2003/0120938 A1 | 6/2003 | Mullor | |
| 2003/0172292 A1 | 9/2003 | Judge | |
| 2003/0217277 A1 | 11/2003 | Narayanan | |
| 2003/0233385 A1* | 12/2003 | Srinivasa et al. | 709/1 |
| 2003/0233431 A1* | 12/2003 | Reddy et al. | 709/221 |
| 2003/0233571 A1* | 12/2003 | Kraus et al. | 713/200 |
| 2004/0003286 A1 | 1/2004 | Kaler et al. | |
| 2004/0103200 A1 | 5/2004 | Ross et al. | |
| 2004/0139353 A1 | 7/2004 | Forcade | |
| 2004/0221163 A1 | 11/2004 | Jorgensen et al. | |
| 2004/0230831 A1 | 11/2004 | Spelman et al. | |
| 2004/0260754 A1 | 12/2004 | Olson et al. | |
| 2005/0004863 A1 | 1/2005 | Havrilak | |
| 2005/0015591 A1 | 1/2005 | Thrash et al. | |
| 2005/0015752 A1 | 1/2005 | Alpern et al. | |
| 2005/0022003 A1 | 1/2005 | Oliphant | |
| 2005/0022021 A1 | 1/2005 | Bardsley et al. | |
| 2005/0022172 A1 | 1/2005 | Howard | |
| 2005/0039046 A1 | 2/2005 | Bradsley et al. | |
| 2005/0044405 A1 | 2/2005 | Spraggs | |
| 2005/0044418 A1 | 2/2005 | Miliefsky et al. | |
| 2005/0055565 A1 | 3/2005 | Fournet | |
| 2005/0091227 A1 | 4/2005 | McCollum et al. | |
| 2005/0102536 A1* | 5/2005 | Patrick et al. | 713/201 |
| 2005/0120231 A1 | 6/2005 | Harada et al. | |
| 2005/0125272 A1 | 6/2005 | Hostetler | |
| 2005/0125689 A1* | 6/2005 | Snyder | 713/200 |
| 2005/0131978 A1 | 6/2005 | Meredith et al. | |
| 2005/0138426 A1 | 6/2005 | Styslinger | |
| 2005/0144471 A1 | 6/2005 | Shupak et al. | |
| 2005/0182941 A1 | 8/2005 | Della-Libera et al. | |
| 2005/0182969 A1 | 8/2005 | Ginter et al. | |
| 2005/0188221 A1 | 8/2005 | Motsinger et al. | |
| 2005/0190769 A1 | 9/2005 | Smith | |
| 2005/0198332 A1 | 9/2005 | Laertz et al. | |
| 2005/0198520 A1 | 9/2005 | Bardsley et al. | |
| 2005/0234926 A1 | 10/2005 | Warner | |
| 2005/0246716 A1 | 11/2005 | Smith et al. | |
| 2005/0246776 A1 | 11/2005 | Chawro et al. | |
| 2005/0273860 A1 | 12/2005 | Chess | |
| 2005/0283622 A1 | 12/2005 | Hall | |
| 2005/0283831 A1 | 12/2005 | Ryu et al. | |
| 2006/0230430 A1 | 10/2006 | Hondo | |
| 2006/0236394 A1 | 10/2006 | Morrow | |
| 2006/0265740 A1 | 11/2006 | Clark | |
| 2006/0277606 A1 | 12/2006 | Yunus | |
| 2006/0282891 A1 | 12/2006 | Pasko | |
| 2007/0016955 A1* | 1/2007 | Goldberg et al. | 726/25 |
| 2007/0156375 A1 | 7/2007 | Meier | |
| 2007/0156420 A1 | 7/2007 | Meier | |
| 2007/0157156 A1 | 7/2007 | Meier | |
| 2007/0157311 A1 | 7/2007 | Meier | |
| 2007/0162890 A1 | 7/2007 | Meier | |
| 2007/0192344 A1 | 8/2007 | Meier | |
| 2007/0199050 A1 | 8/2007 | Meier | |
| 2007/0289009 A1* | 12/2007 | Phan-Anh | 726/12 |
| 2008/0098479 A1* | 4/2008 | O'Rourke et al. | 726/25 |

FOREIGN PATENT DOCUMENTS

| | | |
|---|---|---|
| WO | WO 98/53399 | 11/1998 |
| WO | 0056027 A1 | 9/2000 |
| WO | 03101069 A1 | 12/2003 |

OTHER PUBLICATIONS

Brose; Securing Web Services with SOAP Security Proxies; 4 pages.
Chadwick, D.; Threat Modelling for Active Directory; 10 pages.
Connie U. Smith et al., Performance Engineering Evaluation of Object-Oriented Systems with SPE•ED™, Computer Performance Evaluation: Modelling Techniques and Tools, No. 1245, Springer-Verlag, Berlin, 1997, 21 pages.
Connie U. Smith et al., Software Performance Engineering: A Case Study Including Performance Comparison with Design Alternatives, IEEE Transactions on Software Engineering, Jul. 1993, pp. 720-741, vol. 19, No. 7.
Desmet, L., et al.; Threat Modelling for Web Services Based Web Applications; 14 pages.
Dunn, M.; Cyber-Threats and Countermeasures Towards an Analytical Framework for Explaining Threat Politics in the Information Age; Aug. 2004; 35 pages.
Hondo, et al.; Securing Web services; 2002; 12 pages.
J.D. Meier et al., Threat Modeling Web Applications, May 2005. http://msdn.microsoft.com/library/default.asp?url=/library/en-us/dnpag2/html/tmwa.asp, last accessed on Nov. 15, 2005, 6 pages.
Jon Oltsik, Information Security Brief, Apr. 2005. http://www.appsecinc.com/news/APPSECINC_April.pdf, 3 pages.
Joshi, et al.; Security models for Web-based applications ; 2001; 7 pages.
Kudo, et al.; XML Document Security based on Provisional Authorization; 2000; 10 pages.
Meier, J., et al.; Chapter 2—Threats and Countermeasures: Improving Web Application Security; Jun. 2003, 22 pages; http://msdn.microsoft.com/library/default.asp?url=/library/en-us/dnnetsec/html/THCMCh02.asp; last viewed May 1, 2006.
MSDN. "Chapter 1—Fundamentals of Engineering for Performance" http://msdn.microsoft.com/library/en-us/dnpag/html/scalenetchapt01.asp?frame=true, last viewed Dec. 1, 2006, 9 pages.
Security in a Web Services World: A Proposed Architecture and Roadmap, Apr. 7, 2002. http://msdn.microsoft.com/library/default.asp?url=/library/en-us/dnwssecur/html/securitywhitepaper.asp, last accessed on Nov. 15, 2005, 20 pages.
Simonetta Balsamo et al., Deriving Performance Models from Software Architecture Specifications. http://www.dsi.unive.it/~balsamo/saladin/bal-sim.2.01.pdf, 6 pages.
Stephen S. Yau, An Integrated Life-Cycle Model for Software Maintenance, IEEE Transactions on Software Engineering, Aug. 1988, pp. 1128-1144, vol. 14, No. 8.
Patterns and Practices Security Engineering Explained; 2 pages; http://msdn.microsoft.com/library/default.asp?ur1=/library/en-us/dnpag2/html/scccngexplained.asp; last viewed Mar. 29, 2005.
Meier,J.D., et al; Patterns and Practices Security Index; Aug. 2005; 5 pages; http://msdn.microsoft.com/library/default.asp?url=/library/en-us/dnpag2/html/securityengindex.asp.
Meier,J.D., et al; Patterns and Practices Web Application Security Engineering Index; Aug. 2005; 4 pages; http://msdn.microsoft.com/ library/default.asp?url=/library/en-us/dnpag2/html/WebAppSecurityEngIndex.asp last viewed Mar. 29, 2005.

Meier,J.D., et al; Patterns and Practices Security Deployment Review Index; Aug. 2005; 2 pages; http://msdn.microsoft.com/1ibrary/en-us/dnpag2/html/SecurityDeploymentReviewIndex.asp. Last viewed Mar. 29, 2005.

Meier,J.D., et al; Security Engineering Explained; 2205; 51 pages.

".NET Framework Security", by Meier et al., Microsoft Corporation, Jun. 2003.

Smith, "Designing High Performance Distributed Application s Using Software Performance Engineering: A Tutorial." Performance Engineering Services 1996.

Wiederhold "The Roles of Artificial Intelligence in Information Systems", Hounal of Intelligent Information Systems. 1992.

L. Liu et al., Security and Privacy Requirements Analysis within a Social Setting, Proceedings of the 11th IEEE Joint International Congerence on Requirements Engineering (RE), Sep. 8-12, 2003, pp. 151-161.

R. Crook et al., Security Requirements Engineering: When Anti-Requirements Hit the Fan, Proceedings of the IEEE Joint International Conference on Requirements Engineering(RE'02), IEEE Computer Society, 2002, 3 Pages.

Office Action dated Feb. 11, 2008 cited in U.S. Appl. No. 11/321,153.

Office Action dated Mar. 6, 2009 cited in U.S. Appl. No. 11/321,153.

Office Action dated Mar. 19, 2008 cited in U.S. Appl. No. 11/382,857.

Office Action dated Oct. 17, 2008 cited in U.S. Appl. No. 11/382,857.

Office Action dated Mar. 6, 2009 cited in U.S. Appl. No. 11/382,857.

Office Action dated Jun. 23, 2008 cited in U.S. Appl. No. 11/321,818.

Office Action dated Mar. 24, 2009 cited in U.S. Appl. No. 11/321,818.

Office Action dated May 15, 2009 cited in U.S. Appl. No. 11/321,425.

Office Action dated Aug. 4, 2009 cited in U.S. Appl. No. 11/382,858.

Office Action dated Dec. 5, 2008 cited in U.S. Appl. No. 11/321,818.

Office Action dated Jun. 22, 2009 cited in U.S. Appl. No. 11/353,821.

Office Action dated Jun. 12, 2009 cited in U.S. Appl. No. 11/382,861.

Meier,J.D., et al.; Cheat Sheet: Web Application Security Frame; May 2005; 6 pages; http://msdn.microso ft.com/1ibrary/default.asp?url=/library/en-us/dnpag2/htmlTMWAcheatsheet.asp.

Meier,J.D., et al.; Improving Web Application Security: Threats and Countermeasures; Jun. 2003; 6 pages; http://msdn.microsoft.com/library/default.asp?url=/library/en-us/dnnetsec/html/ThreatCounter.asp last viewed Mar. 29, 2005.

"Performance and Scalability of Distributed Software Architectures: An SPE Approach", Smith et al., CiteSeer 2002.

Microsoft Corporation; Patterns and Practices Security Engineering Explained; Oct. 2005; 4 pages; http://msdn.microsoft.com/library/default.asp?url=/library/en-us/dnpag2/html/scccngexplained.asp.

Papaefstathiou, Design of a Perfomance Technology Infrastructure to Support the Construction of Responsice Software. Microsoft Sep. 26, 2000.

Devanbu, et al., Software Engineering for Security: a Roadmap. ACM 2000.

Office Action dated Jun. 11, 2008 cited in U.S. Appl. No. 11/382,861.

Office Action dated Dec. 4, 2008 cited in U.S. Appl. No. 11/382,861.

Office Action dated Sep. 14, 2009 cited in U.S. Appl. No. 11/321,153.

Tadashi Ohta and Tetsuya Chikaraishi, Network security model, ATR Communication Systems Research Laboratories, 2-2, Hikaridai, Seika-cho, Soraku-gun, Kyoto 619-02, Japan http://ieeexplore.ieee.org/search/srchabstract.jsp?arnumber=515640&isnumber=11283&punumber=3866&k2dockey=515640@ieeecnfs&query=%28network+security%29%3Cin%3Emetadata&pos=1.

Gerald A. Marin, Network security basics, Basic Training, IEEE Security & Privacy, Published by the IEEE Computer Society, Nov./Dec. 2005 http://ieeexplore.ieee.org/search/srchabstract.jsp?arnumber=1556540&isnumber=33104&punumber=8013&k2dockey=1556540@ieeejrns&query=%28network+security%29%3Cin%3Emetadata&pos=6.

Jiang Tao, et al., The research on dynamic self-adaptive network security model based on mobile agent, National Engineering Research Center for Computer Software, 308 mailbox of Northeastern University, Shen yang, 110006, China http://ieeexplore.ieee.org/search/srchabstract.jsp?arnumber=885909&isnumber=19142&punumber=7108&k2dockey=885909@ieeecnfs&query=%28network+security%.

D. Snow and W. Chang, Network security http://ieeexplore.ieee.org/search/srchabstract.jsp?arnumber=267863&isnumber=6694&punumber=630&k2dockey=267863@ieeecnfs&query=%28network+security%29%3Cin%3Emetadata&pos=8.

FortiGate™ series of ASIC-accelerated multi-threat security systems http://www.fortinet.com/products/.

Office Action dated Nov. 10, 2009 cited in U.S. Appl. No. 11/353,821.

Office Action dated Nov. 25, 2009 cited in U.S. Appl. No. 11/321,425.

Office Action dated Dec. 9, 2009 cited in U.S. Appl. No. 11/321,818.

Office Action dated Jan. 7, 2010 cited in U.S. Appl. No. 11/382,857.

Office Action dated Jan. 11, 2010 cited in U.S. Appl. No. 11/382,858.

* cited by examiner

CONFIGURING AND ORGANIZING SERVER SECURITY INFORMATION

BACKGROUND

Analysis of computing systems and, more specifically servers, with respect to security and performance has proven to be extremely useful to development requirements and to the design of such systems. As such, it can be particularly advantageous to incorporate security and performance engineering and analysis from the beginning stages of design. Conventionally, the design of systems lacks security engineering and analysis thereby prompting retroactive measures to address identified security attacks and issues.

Today, when developing a computing system, it is oftentimes difficult to protect the server and to predict how the server will react under real-world conditions. In other words, it is difficult to predict security vulnerabilities of a server prior to and during development and/or before completion. Frequently, a developer will have to address threats and attacks to a server that occur under real-world conditions and threats of attacks. This retroactive troubleshooting can consume many hours of developer time—which is very expensive.

Traditionally, designing for server security is oftentimes random and does not produce effective results. As a result, servers are left vulnerable to threats and uninvited attacks. In most cases, the typical developer lacks the expertise to effectively predict vulnerabilities and associated attacks.

While some threats and attacks can be estimated with some crude level of certainty, others cannot. For those security criterions that can be estimated prior to development, this estimate most often requires a great amount of research and guesswork in order to most accurately determine the criterion. The conventional guesswork approach of security analysis is not based upon any founded benchmark. As well, these conventional approaches are not effective or systematic in any way.

Rather, conventional security approaches are based upon a trial-and-error mechanism. In other words, traditional systems tend to be reactive as developers lack the expertise necessary to formulate a proactive security mechanism. As such, these traditional trial-and-error approaches lead to costly interruptions and expensive developer time in order to rectify issues as they arise.

In summary, traditional computing system development approaches do not proactively (and accurately) address security issues related to the server. To the contrary, developers often find themselves addressing security and performance issues after the fact—after development is complete. This retroactive modeling approach is extremely costly and time consuming to the development of computing systems.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises mechanism that can incorporate server security related expertise into a server security schema. Specifically, in disparate aspects, the server security schema can incorporate expertise related to various security related categories including shares, services, accounts, auditing and logging, files and directories, registries, protocols, ports, and patches and updates.

The server security schema component can identify server-related vulnerabilities, threats/attacks and countermeasures that affect a server. In operation, the server security schema component can assist a developer in addressing these security issues related to server security.

As well, in disparate aspects, the categories of the novel server security schema can be tailored to the particular server type. For example, a server security schema related to a web server can address different categories than an application server or a database server. In all, each specific server type can address functionally tailored security categories in order to leverage security-related expertise into the novel server security schema of the innovation.

Still another aspect of the innovation employs an artificial intelligence (AI) component that infers an action that a user desires to be automatically performed. More particularly, an AI or machine learning component can be provided and employs a probabilistic and/or statistical-based analysis to prognose or infer an action that a user desires to be automatically performed. In a specific aspect, the AI component can be employed to select and incorporate security-related categories and related vulnerabilities, threats/attacks and countermeasures into a server security schema.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
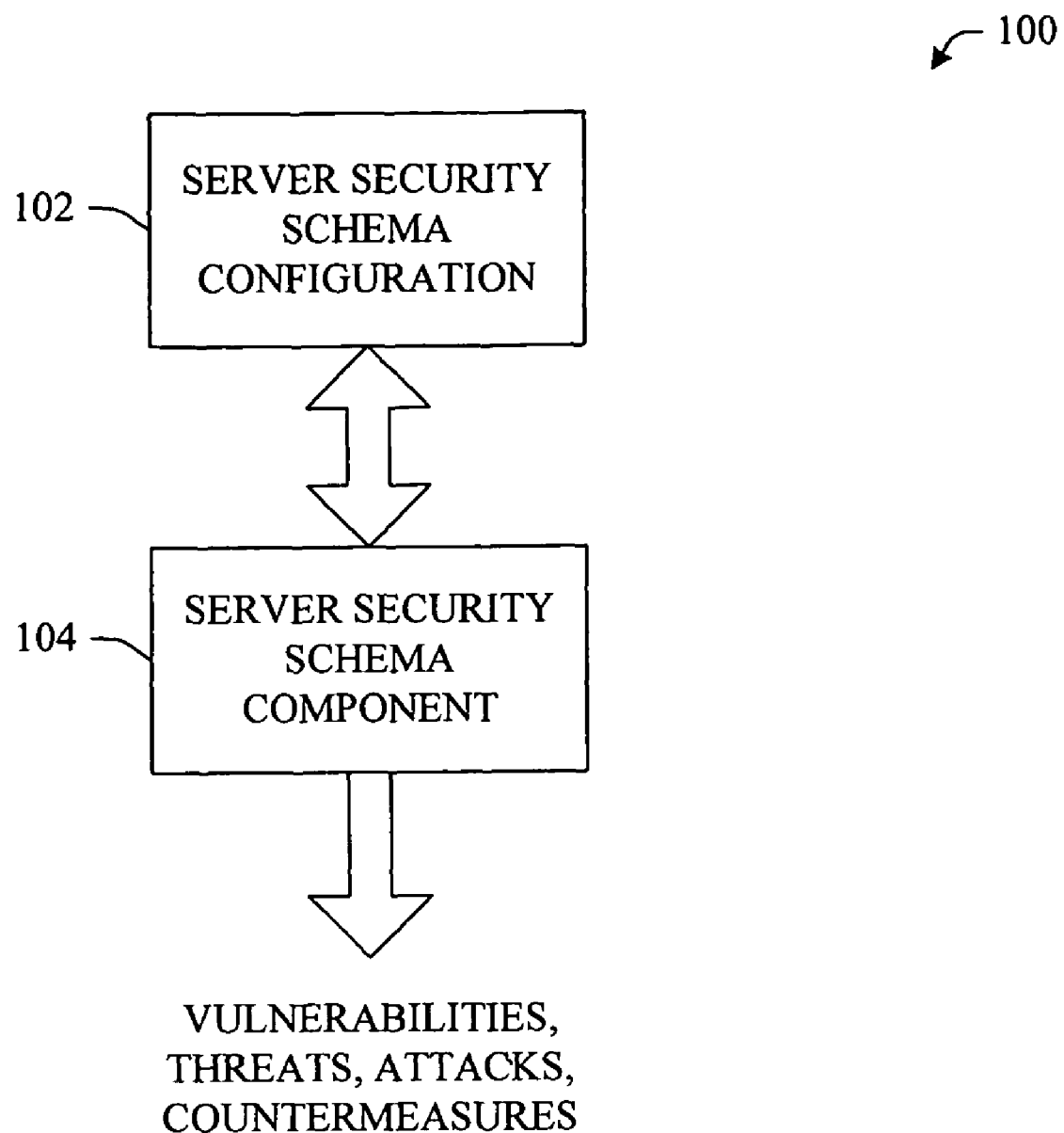
FIG. 1 illustrates a system that facilitates generating a server security schema component in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the figures, FIG. 1 illustrates a system 100 that facilitates configuring and providing a server security schema in accordance with an aspect of the innovation. Generally, system 100 includes a server schema configuration component 102 that facilitates generation of server security schema component 104. As will be understood upon a review of the figures that follow, the server security schema configuration component 104 can enable identification and analysis of specific factors (e.g., vulnerabilities, threats/actions counter measures) with respect to predefined server categories. These specific factors can be leveraged as development expertise into the server security schema component 104.

By way of example, the server security schema component 104 can facilitate identification of vulnerabilities, threats, attacks and countermeasures in areas related to categories such as patches and updates, shares, protocols, among others. As well, it will be understood that the server security categories as well as the server security schema component 104 can be tailored to a specific server type. By way of example and not limitation, server types can include web servers, application servers and database servers. In accordance with each exemplary server type, the novel functionality and advantages thereof will be better understood upon a review of the figures that follow.

Figure 2:
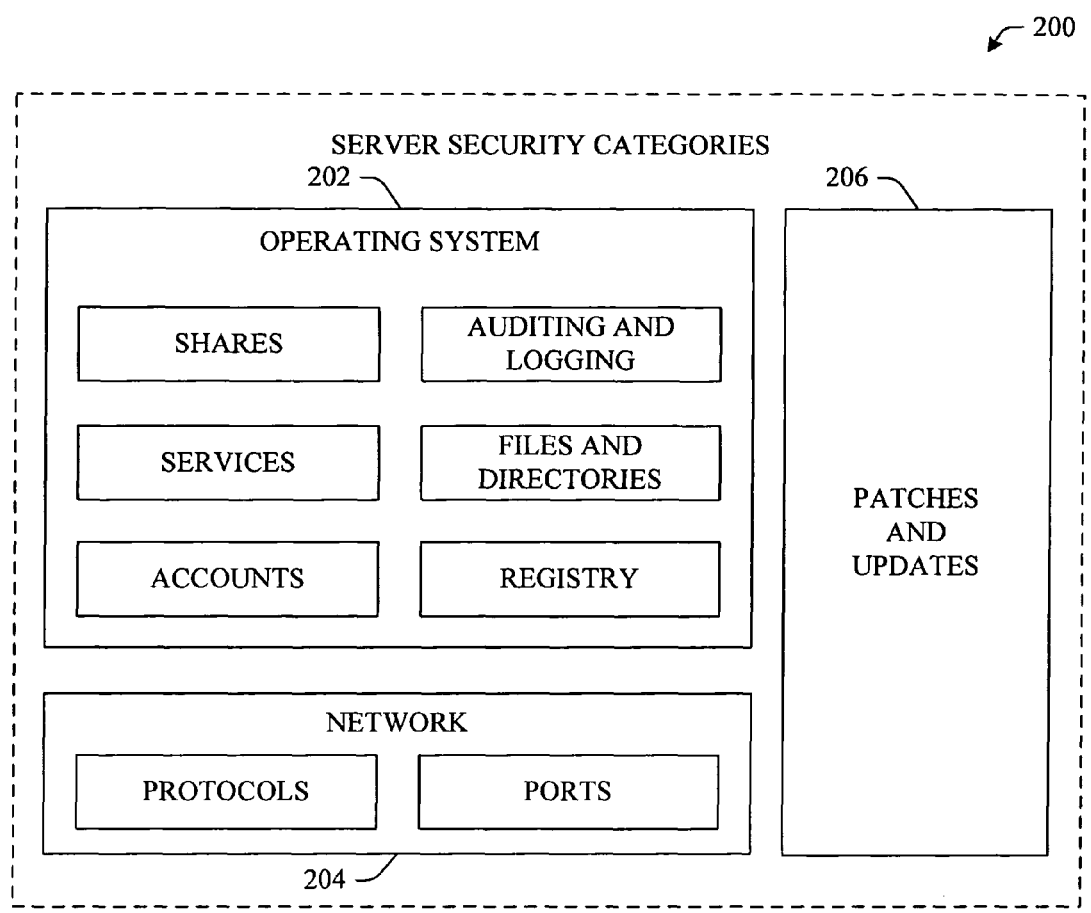
FIG. 2 illustrates exemplary server security categories in accordance with the novel server security schema of the innovation.

Referring now to FIG. 2, a block diagram of exemplary server security categories 200 is shown. As shown, from a high level, the server security categories 200 can be described with reference to operating system categories 202, network categories 204 and patches and updates 206. Moreover, although specific categories 200 are shown in FIG. 2, it is to be understood that other categories can be added to the novel server security schema component 104 in accordance with a specific server type (e.g., web, application, database). These novel categories facilitate leveraging expertise into the security design and development of servers that would not otherwise be available to a typical developer.

A first server security schema category, a patches and updates category 206, is illustrated in FIG. 2. As will be understood, patching and updating server software can be a critical first step in addressing security. For instance, if a server is not patched and updated, the server is left open and provides opportunities for attackers and malicious code to cause security issues.

Turning to a discussion of another server security schema category, with respect to services, if services are necessary, they should be secured and maintained. In other words, it is prudent to consider monitoring any service to ensure availability. If the service software is not secure, but the service is needed, it may be advantageous to try to find a secure alternative.

The protocols category refers to an act of avoiding protocols that are inherently insecure. However, if using these protocols cannot be avoided, it is important to take the appropriate measures to provide secure authentication and communication.

With respect to the accounts category, accounts grant authenticated access to the computer, thus these accounts should be audited. It is particularly important to configure accounts with the least privilege to help prevent elevation of privilege. As well, any unneeded accounts should be removed. Strong password policies will help to slow down (or eliminate) brute force and dictionary. As well, it is helpful to audit and alert for logon failures.

With respect to files and directories, it is prudent to secure all files and directories with restricted permissions (e.g., NTFS permissions) that only allow access to necessary operating system services and user accounts. The operating system auditing features can be employed to detect when suspicious or unauthorized activity occurs.

Turning to a discussion of shares, it is helpful to remove all unnecessary file shares including the default administration shares if they are not required. Any remaining shares should be secured with restricted permissions. Although shares may not be directly exposed to the Internet, a defense strategy, with limited and secured shares, can greatly reduce (or eliminate) risk if a server is compromised.

Referring now to ports, it is to be understood that services that run on the server listen to specific ports so that they can respond to incoming requests. Thus the ports on the server should be audited regularly to ensure that an insecure or unnecessary service is not active on the server.

The registry category relates to the scenario where many security-related settings are stored in the registry. As a result, the registry must be secure. In one aspect, securing the registry can be accomplished by applying restricted operating system access control lists (ACLs) and by blocking remote registry administration.

Finally, auditing is one of the most important tools for identifying intruders, attacks in progress, and evidence of attacks that have occurred. Event and system logs can also help to troubleshoot security problems.

Following is a table that summarizes the list exemplary categories 200 that can be represented within a novel server security schema component 104 in accordance with an aspect of the innovation. As will be understood, this exemplary list of categories 200 can be modified and/or tailored to a specific server type.

| Category Component | Description |
|---|---|
| Patches and Updates | Are patches and/or updates available for the server? Have the latest patches and updates been downloaded and/or installed on the server? |
| Services | Are services necessary? If services are necessary, are they secure? |
| Protocols | Are protocols secured? Have secure authentication and communication procedures been put into place? |
| Accounts | Are accounts audited? Are account privileges accurate? Have unused accounts been removed? Are guest accounts available? Is remote access available? |
| Files and Directories | Is access to files and directories limited? |
| Shares | Do unused shares exist? Is access to shares secure? |
| Ports | Are ports being monitored? |
| Registry | Are registries secured? |
| Auditing and Logging | Are failures being logged? Are intruders identifiable? |

The server security schema component 104 is a pattern-based information model that defines a set of security-related categories specifically chosen with respect to the type of server being developed. Most often, these categories represent the areas where security issues are most often made and/or overlooked. As will be understood upon a review of the figures that follow, the sever security schema component 104 can be employed to leverage expertise not shared by the common user. In other words, the server security schema component 104 can incorporate categories, vulnerabilities, threats/attacks and countermeasures which have been identified by extremely experienced developers through vast amounts of research and testing.

In one particular aspect, the subject innovation can provide a server security schema component 104 (e.g., schema, template) that identifies and explains a set of server-related vulnerabilities and threats/attacks and defines countermeasures (e.g., remedies) that are appropriate to address each threat/attack.

The innovation described herein can facilitate analysis of server security from the perspectives of vulnerabilities, threats, attacks and countermeasures associated therewith. The following terms are used throughout the description, the definitions of which are provided herein to assist in understanding various aspects of the subject innovation.

An "asset" refers to a resource of value such as the data in a database or a file system, or a system resource. In another example, an asset might be an intangible resource or value such as a company's reputation.

A "threat" refers to an undesired event or a potential occurrence—malicious or otherwise—that may harm or compromise an asset.

A "vulnerability" refers to a weakness that makes an exploit (e.g., attack) possible. Vulnerabilities can include operational practices.

An "attack" (or "exploit") refers to an action taken that utilizes one or more vulnerabilities to realize a threat.

A "countermeasure" refers to a safeguard that addresses a threat and mitigates risk. However, a countermeasure does not always directly address threats. Rather, a countermeasure addresses the factors that define threats. For example, a countermeasure can range from improving server design to improving an operational practice.

As described above, the server security schema component 104 of the subject innovation can identify a set of common server-related threats, and the recommended countermeasures to address each one. Although this description does not contain an exhaustive list of threats, vulnerabilities and/or countermeasures, it is to be understood that it does highlight many top threats. With this information and knowledge of how an attacker works, a user can identify additional threats. To this end, the novel server security schema 104 can enable a user to identify vulnerabilities and threats that are most likely to impact a server.

While there are many variations of specific attacks and attack techniques, it can be particularly useful to view threats in terms of what the attacker is trying to achieve. In other words, focus can be shifted from the identification of every specific attack to focusing on the end results of possible attacks. Threats faced by the server can be categorized based on the goals and purposes of the attacks. A working knowledge of these categories of threats can help organize a security strategy so that preparation can be made with respect to responses to threats.

Figure 3:
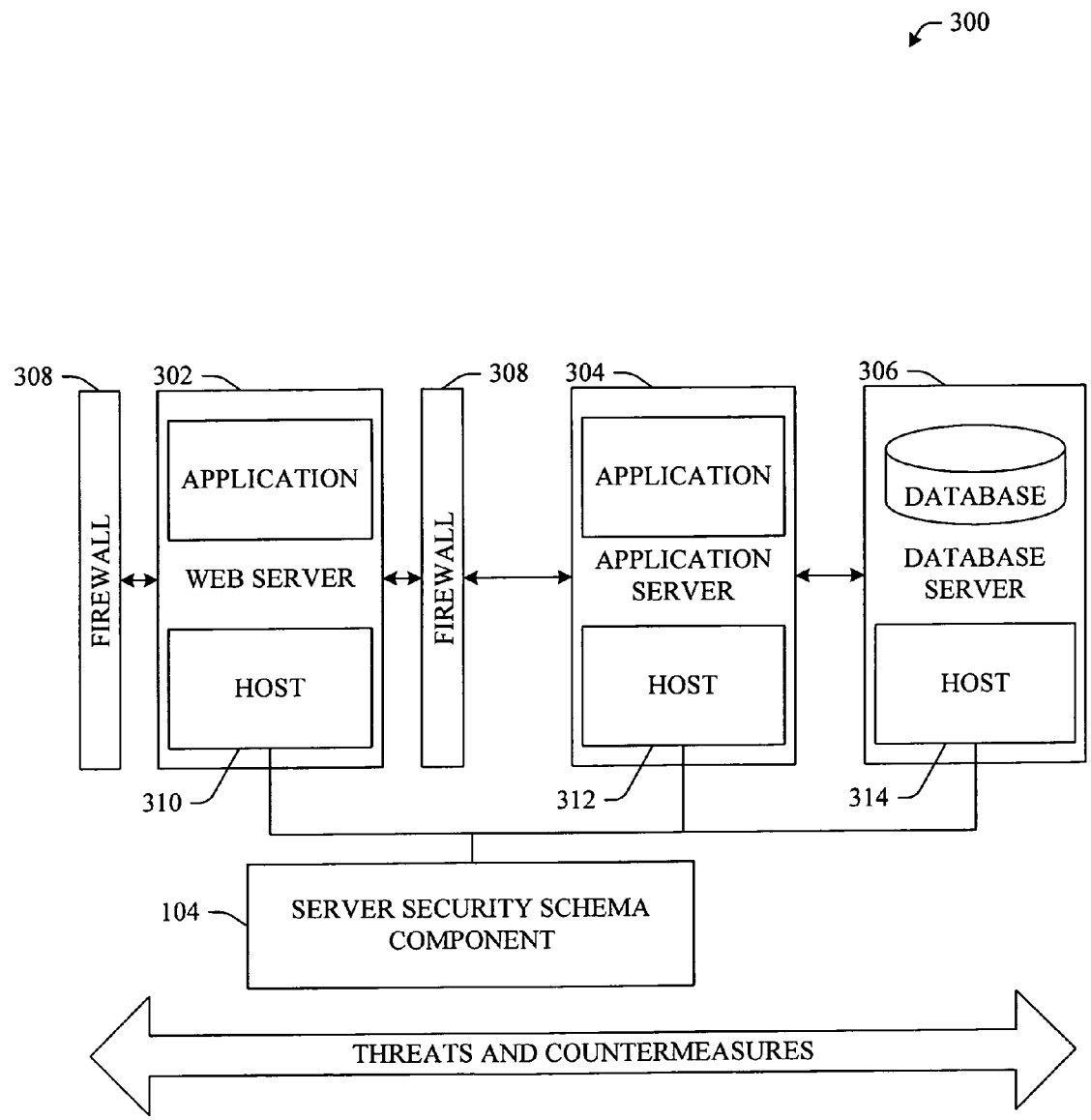
FIG. 3 illustrates an exemplary architecture of a server-based computing system in accordance with an aspect of the innovation.

Turning now to FIG. 3, an exemplary architecture 300 of a computing system scenario is shown. As illustrated, generally, the architecture 300 can include a web server 302, an application server 304 and a database server 306. In one aspect, the web server 302 can be protected by firewalls 308 as shown.

Moreover, the web server 302, the application server 304 and the database server 306 can house applications and hosts 310, 312 and 314 respectively. In accordance with the novel functionality of the innovation, the server security schema component 104 can employ the aforementioned security categories (200 of FIG. 2) to organize and address common security vulnerabilities, threats/attacks and countermeasures. In other words, this information and expertise can be incorporated into the server security component 104 thereby providing security guidance by leveraging this expertise with respect to servers 302, 304 and 306.

Figure 4:
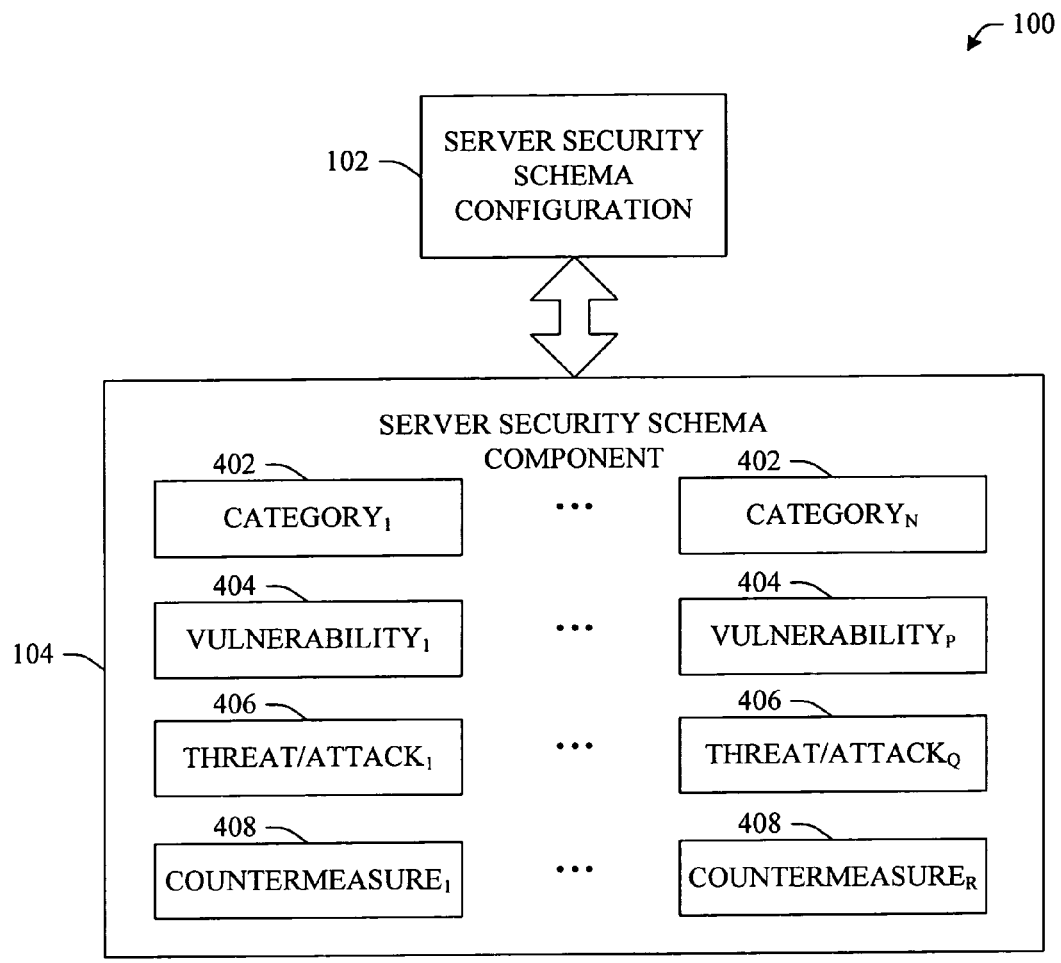
FIG. 4 illustrates an exemplary server security schema component in accordance with an aspect of the innovation.

Referring now to FIG. 4, an alternative block diagram of system 100 is shown. More particularly, as illustrated, the server security schema component 104 can include 1 to N category components 402, 1 to P vulnerability components 404, 1 to Q threat/activity components 406, and 1 to R countermeasure components 408. Each of these server security schema 104 subcomponents (402, 404, 406, 408) will be better understood upon a review of the figures that follow.

More specifically, the subcomponents (402, 404, 406, 408) of the server security schema component 104 will be described with reference to specific server types (e.g., web server, application server, database server). While specific server scenarios are described herein, it is to be understood and appreciated that other scenarios exist where disparate categories 402, vulnerabilities 404, threat/attacks 406 and countermeasures 408 can be addressed. These additional aspects are to be included within the scope of the innovation and claims appended hereto.

Figure 5:
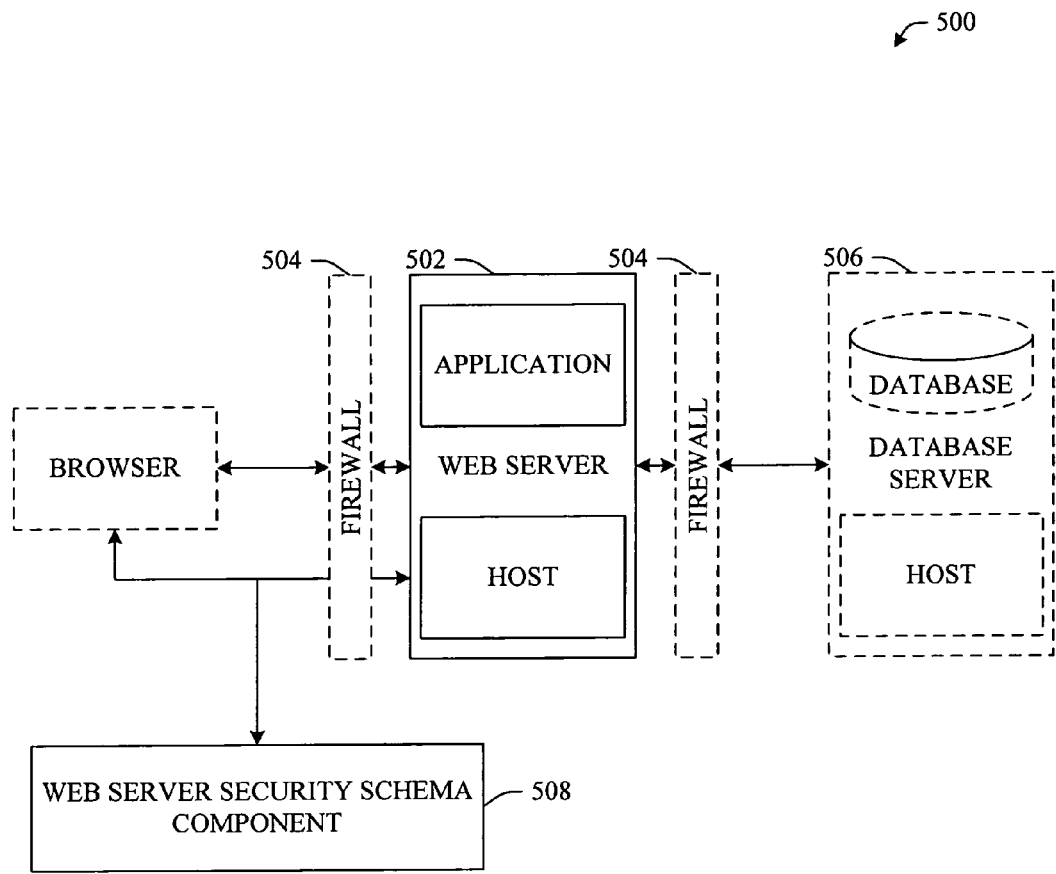
FIG. 5 illustrates an exemplary architecture of a web server system and related web server security schema in accordance with an aspect of the innovation.

Referring now to FIG. 5, an architecture of system 500 is shown in accordance with an aspect of the innovation. More particularly, system 500 can include a web server 502 protected by firewalls 504. As well, architecture 500 can include a database server 506. In accordance with the novelty of the innovation, web server security schema component 508 can be configured with expertise that can facilitate a developer to proactively address security categories and vulnerabilities, threats and attacks associated therewith. As well, the web server security schema component 508 can leverage expertise by identifying countermeasures that address potential threats and attacks.

This web-server scenario presents a system and methodology as well as a series of acts that can assist to secure a web server. As described supra, the acts are divided into common configuration categories (e.g., 200 of FIG. 2), for example, including patches and updates, ports, protocols, accounts, services, files and directories and others. This list of categories can assist a developer to systematically walk through the securing process from top to bottom or to choose a particular category and complete specific steps. In other aspects, scenarios are presented that address the basic hardening steps for the .NET-brand framework for web servers that host ASP.NET-brand web applications.

The web server security schema component 508 enables a proven mechanism to secure web servers. Below is an explanation of the most common web server security threats as well as acts that can facilitate securing the web server. It will be understood that a secure web server can provide a protected foundation for hosting web applications. The web server configuration plays a critical role in web application security. Badly configured virtual directories, a common mistake, can lead to unauthorized access. For example, a forgotten share can provide a convenient back door, while an overlooked port can be an attacker's front door. Neglected user accounts can permit an attacker to slip by your defenses unnoticed.

Part of the challenge of securing a web server is recognizing a goal. As soon as it is known what a secure web server is, it can be possible to learn how to apply the configuration settings to create the secure server. The web server security schema component 508 provides a systematic, repeatable approach that can be used to successfully configure a secure web server.

The web server discussion that follows begins by reviewing the most common threats that affect web servers. This perspective is employed to create a mechanism that addresses web server security. The scenario then puts the mechanisms into practice, and takes a step-by-step approach that demonstrates how to improve web server security. It is to be understood that the acts described herein are modular and demonstrate how the methodology can be put into practice. As well, the procedures can be employed on existing web servers or on new ones.

Turning now to a discussion of threats and countermeasures, the fact that an attacker can strike remotely makes a web server an appealing target. Understanding threats to a web server and being able to identify appropriate countermeasures permits a developer to anticipate many attacks and thwart the ever-growing numbers of attackers. Continuing with the web server example, some threats to a web server can include:
  Profiling
  Denial of service
  Unauthorized access
  Arbitrary code execution
  Elevation of privileges
  Viruses, worms, and trojan horses Profiling, or host enumeration, is an exploratory process used to gather information about a web site. An attacker uses this information to attack known weak points or vulnerabilities. Common vulnerabilities that make a web server susceptible to profiling include:
  Unnecessary protocols
  Open ports
  Web servers providing configuration information in banners
  Common attacks used for profiling include:
  Port scans
  Ping sweeps
  NetBIOS and server message block (SMB) enumeration
  Countermeasures can include blocking all unnecessary ports, blocking Internet Control Message Protocol (ICMP) traffic, and disabling unnecessary protocols such as NetBIOS and SMB. All of this expertise can be built into the novel server security schema.

Denial of service attacks can occur when a server is overwhelmed by service requests. The threat is that the web server can be too overwhelmed to respond to legitimate client requests.
  Vulnerabilities that increase the opportunities for denial of service include:
  Weak TCP/IP stack configuration
  Unpatched servers
  Common denial of service attacks include:
  Network-level SYN floods
  Buffer overflows
  Flooding the web server with requests from distributed locations
  Countermeasures can include hardening the TCP/IP stack and consistently applying the latest software patches and updates to system software.

Unauthorized access can occur when a user without correct permissions gains access to restricted information or performs a restricted operation. Common vulnerabilities that lead to unauthorized access include:
  Weak IIS web access controls including web permissions
  Weak NTFS permissions
  Countermeasures can include using secure web permissions, NTFS-brand permissions, and .NET-brand framework access control mechanisms including URL authorization.

Arbitrary code execution attacks occur when an attacker runs malicious code on a web server either to compromise server resources or to mount additional attacks against downstream systems.
  Vulnerabilities that can lead to malicious code execution include:
  Weak IIS configuration
  Unpatched servers
  Common code execution attacks include:
  Path traversal
  Buffer overflow leading to code injection
  Countermeasures include configuring IIS to reject URLs with " . . . /" to prevent path traversal, locking down system commands and utilities with restrictive ACLs, and installing new patches and updates.

Elevation of privilege attacks occur when an attacker runs code by using a privileged process account. Common vulnerabilities that make a web server susceptible to elevation of privilege attacks include:
  Over-privileged process accounts
  Over-privileged service accounts
  Countermeasures include running processes using least privileged accounts and using least privileged service and user accounts.

With respect to viruses, worms, and trojan horses, malicious code comes in several varieties, including:

Viruses—Programs that are designed to perform malicious acts and cause disruption to an operating system or applications;

Worms—Programs that are self-replicating and self-sustaining; and

Trojan horses—Programs that appear to be useful but that actually do damage.

In many cases, malicious code is unnoticed until it consumes system resources and slows down or halts the execution of other programs. For example, the "Code Red" worm was one of the most notorious to afflict IIS, and it relied upon a buffer overflow vulnerability in an ISAPI filter.

Common vulnerabilities that make a web server susceptible to viruses, worms, and trojan horses include:

Unpatched servers

Running unnecessary services

Unnecessary ISAPI filters and extensions

Countermeasures include the prompt application of the latest software patches, disabling unused functionality such as unused ISAPI filters and extensions, and running processes with least privileged accounts to reduce the scope of damage in the event of a compromise.

In order to secure a web server, a developer can apply many configuration settings to reduce the server's vulnerability to attack. So, how does a developer know where to start, and when are they finished? One particularly novel approach is to organize the precautions to take and the settings of configuration, into categories. As described with reference to FIG. 2 supra, using categories allows a developer or user to systematically walk through the securing process from top to bottom or pick a particular category and complete specific steps.

Referring again to the categories of FIG. 2, the rationale to each category expanded for a specific web server security schema scenario can be described as follows:

Patches and Updates—Many security threats are caused by vulnerabilities that are widely published and well known. In many cases, when a new vulnerability is discovered, the code to exploit it is posted on Internet bulletin boards within hours of the first successful attack. If a user does not patch and update the server, opportunities exist for attackers and malicious code. Patching and updating the server software is a critical first step towards securing the web server.

Services—Services are prime vulnerability points for attackers who can exploit the privileges and capabilities of a service to access the local web server or other downstream servers. If a service is not necessary for the web server's operation, it should not be run on the server. If the service is necessary, secure it and maintain it. Consider monitoring any service to ensure availability. If the service software is not secure, but the service is necessary, try to find a secure alternative.

Protocols—Avoid using protocols that are inherently insecure. If using these protocols cannot be avoided, take the appropriate measures to provide secure authentication and communication, for example, by using IPSec policies. Examples of insecure, clear text protocols are Telnet, Post Office Protocol (POP3), Simple Mail Transfer Protocol (SMTP), and File Transfer Protocol (FTP) among others.

Accounts—Accounts grant authenticated access to a computer, and these accounts should be audited. What is the purpose of the user account? How much access does it have? Is it a common account that can be targeted for attack? Is it a service account that can be compromised and must therefore be contained? Configure accounts with least privilege to help prevent elevation of privilege. Remove any accounts that are not needed. Slow down brute force and dictionary attacks with strong password policies, and then audit and alert for logon failures.

Files and Directories—Secure all files and directories with restricted NTFS permissions that only allow access to necessary operating system services and user accounts. Use operating system auditing to allow detection of when suspicious or unauthorized activity occurs.

Shares—Remove all unnecessary file shares including the default administration shares if they are not required. Secure any remaining shares with restricted NTFS permissions. Although shares may not be directly exposed to the Internet, a defense strategy, with limited and secured shares, reduces risk if a server is compromised.

Ports—Services that run on the server listen to specific ports so that they can respond to incoming requests. Audit the ports on the server regularly to ensure that an insecure or unnecessary service is not active on the web server. If an active port that was not opened by an administrator is detected, this can be a sign of unauthorized access and a security compromise.

Registry—Many security-related settings are stored in the registry and as a result, the registry must be secured. This can be accomplished by applying restricted ACLs and by blocking remote registry administration.

Auditing and Logging—Auditing is one of the most important tools for identifying intruders, attacks in progress, and evidence of attacks that have occurred. Use a combination of operating system and IIS auditing features to configure auditing on the web server. Event and system logs also help to troubleshoot security problems.

Sites and Virtual Directories—Sites and virtual directories are directly exposed to the Internet. Even though secure firewall configuration and defensive ISAPI filters such as URLScan (which is included within the IISLockdown tool) can block requests for restricted configuration files or program executables, a defense in depth strategy is recommended. Relocate sites and virtual directories to non-system partitions and use IIS web permissions to further restrict access.

Script Mappings—Remove all unnecessary IIS script mappings for optional file extensions to prevent an attacker from exploiting any bugs in the ISAPI extensions that handle these types of files. Unused extension mappings are often overlooked and represent a major security vulnerability.

ISAPI Filters—Attackers have been successful in exploiting vulnerabilities in ISAPI filters. Remove unnecessary ISAPI filters from the web server.

IIS Metabase—The IIS metabase maintains IIS configuration settings. A developer must be sure that the security related settings are appropriately configured, and that access to the metabase file is restricted with hardened NTFS permissions.

Machine.config—The Machine.config file stores machine-level configuration settings applied to .NET Framework applications including ASP.NET web applications. It can be important to modify the settings in Machine.config to ensure that secure defaults are applied to any ASP.NET application installed on the server.

Code Access Security—Restrict code access security policy settings to ensure that code downloaded from the Internet or intranet have no permissions and as a result will not be allowed to execute.

Figure 6:
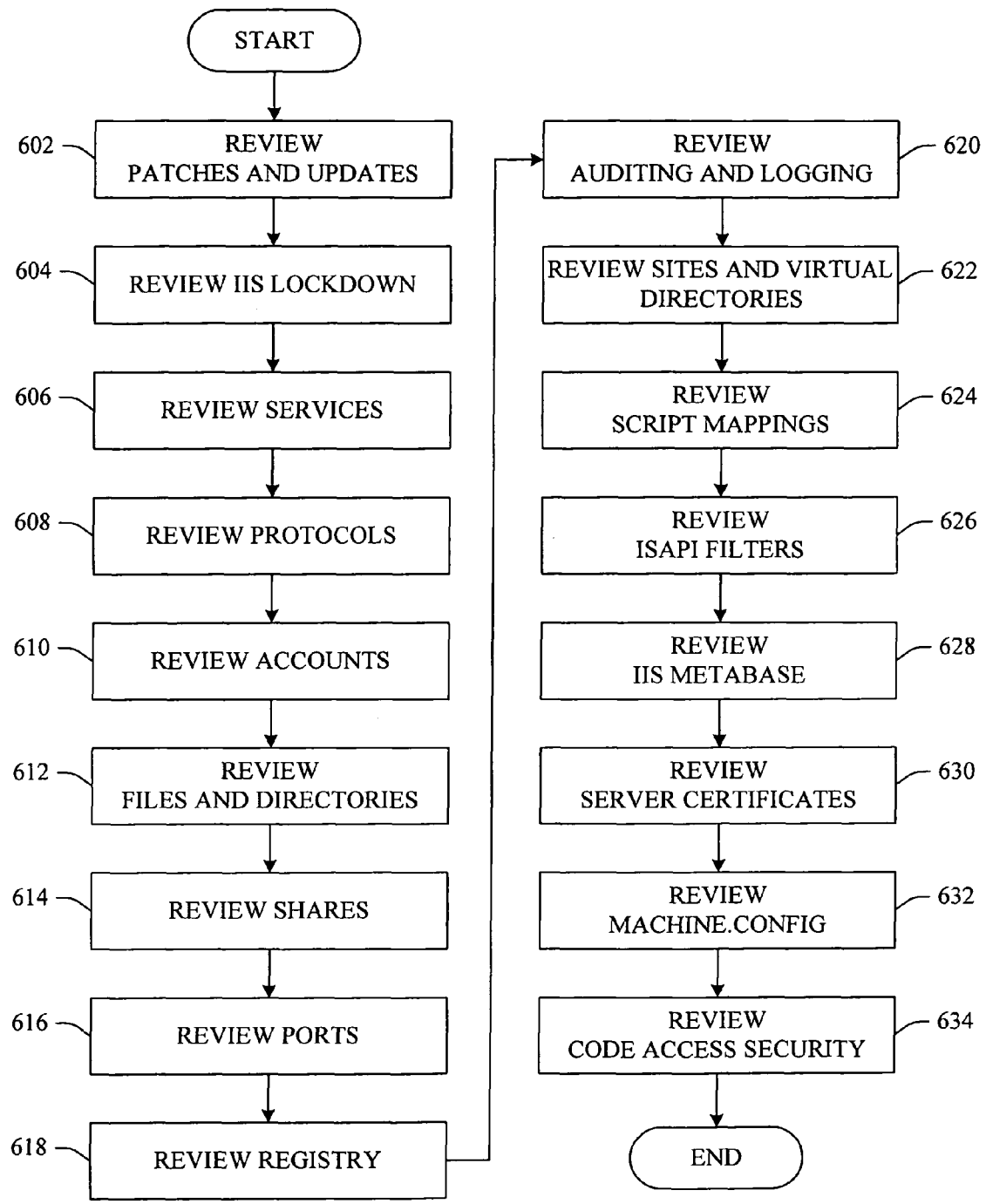
FIG. 6 illustrates an exemplary flow chart of procedures for reviewing web server security in accordance with an aspect of the innovation.

FIG. 6 illustrates a methodology of securing a web server in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As shown in FIG. 6, seventeen high-level exemplary acts are shown. It will be understood upon a review of FIG. 6 that each high-level act shown can include one or more sub-actions to secure or address a particular area or feature.

Referring first to 602, patches and updates are reviewed. In this act, a developer can update the server with the latest service packs and patches. For example, the developer can detect and install the required patches and updates and update accordingly (e.g., the .NET framework).

With respect to detecting and installing patches and updates, a developer can employ a tool to detect the patches and updates that may be missing from the current installation. For example, the tool can compare the installation to a list of currently available updates maintained in an XML file. Accordingly, the tool can facilitate downloading the XML file when it scans the server or the developer can manually download the file to the server or make it available on a network server.

At 602, the IIS lockdown can be reviewed. For example, a tool can be employed to assist with automation of certain security steps. It will be appreciated that IIS lockdown greatly reduces the vulnerability of a web server. It allows a developer to choose a specific type of server role, and then use custom templates to improve security for that particular server. The templates can either disable or secure various features. In addition, IIS Lockdown can install the URL scan ISAPI filter which allows web site administrators to restrict the kind of HTTP requests that the server can process, based on a set of rules that the administrator controls. By blocking specific HTTP requests, the URL scan filter prevents potentially harmful requests from reaching the server and causing damage.

Services can be reviewed at 606. Services that do not authenticate clients, services that use insecure protocols, or services that run with too much privilege are risks. If the services are not needed, they should not be run. By disabling unnecessary services the developer can quickly and easily reduce the attack surface. Moreover, overhead can be reduced in terms of maintenance, for example, patches, service accounts, and so on. If a service is run, it is particularly important to make sure that it is secure and maintained. To do so, the service should be run using a least privilege account, and keep the service current by applying patches.

At 608, the protocols are reviewed. By preventing the use of unnecessary protocols, a developer can reduce the potential for attack. For example, the .NET framework provides granular control of protocols through settings in the Machine.config file. By way of further example, a developer can control whether web services can use HTTP GET, POST or SOAP.

Continuing with the methodology of FIG. 6, accounts can be reviewed at 610. Accordingly, it can be particularly important for a developer to remove accounts that are not used because an attacker might discover and use them. As well, strong passwords should be required. It will be understood that weak passwords increase the likelihood of a successful brute force or dictionary attack. Similarly, it is important to use least privilege as an attacker can use accounts with too much privilege to gain access to unauthorized resources.

Files and directories can be reviewed at 612. Use of strong access controls can be employed to protect sensitive files and directories. In most situations, an approach that allows access to specific accounts is more effective than one that denies access to specific accounts. A developer can set access at the directory level whenever possible. As files are added to the folder they inherit permissions from the folder, so no further action may be necessary.

Shares can be reviewed at 614 to remove any unused shares and harden the permissions on any essential shares. By default, users have full control on newly created file shares. These default permissions should be hardened to ensure that only authorized users can access files exposed by the share. In addition to explicit share permissions, ACLs should be used for files and folders exposed by the share.

Still further, ports can be reviewed at 616. Services that run on the server use specific ports so that they can serve incoming requests. All unnecessary ports should be closed and the developer should perform regular audits to detect new ports in the listening state, which could indicate unauthorized access and a security compromise.

At 618, the registry should be reviewed. It will be understood that the registry is the repository for many vital server configuration settings. As such, it is particularly important to ensure that only authorized administrators have access to it. If an attacker is able to edit the registry, the security of the server can be reconfigured and compromised.

Auditing and logging are reviewed at 620. Auditing does not prevent system attacks, although it is an important aid in identifying intruders and attacks in progress, and can assist in diagnosing attack footprints. A minimum level of auditing should be enabled on the web server. As well, the developer should use permissions to protect the log files so that an attacker cannot cover tracks by deleting or updating the log files in any way.

Sites and virtual directories can be reviewed at 622. In this act, a developer can relocate web roots and virtual directories to a non-system partition to protect against directory traversal attacks. It will be appreciated that these attacks allow an attacker to execute operating system programs and utilities. It is not possible to traverse across drives. For example, this approach ensures that any future canonicalization worm that allows an attacker to access system files will fail. By way of further example, if the attacker formulates a URL that contains the path /scripts/ . . . %5c . . . /winnt/system32/cmd.exe, the request will fail.

At 624, script mappings that associate a particular file extension, such as .asp, to the ISAPI extension that handles it, such as Asp.dll. can be reviewed. In this example, IIS can be configured to support a range of extensions including .asp, . shtm, .hdc, and so on. It will be understood that ASP.NET HTTP handlers are a rough equivalent of ISAPI extensions. In IIS, file extensions, such as .aspx, are first mapped in IIS to Aspnet_isapi.dll, which forwards the request to the ASP.NET worker process. The actual HTTP handler that processes the file extension is then determined by the <HttpHandler> mapping in Machine.config or Web.config.

ISAPI filters can be reviewed. Conventionally, vulnerabilities in ISAPI filters caused significant IIS exploitation. In most cases, there are no unneeded ISAPI filters after a clean IIS installation, although the .NET framework installs the ASP.NET ISAPI filter (Aspnet_filter.dll), which is loaded into the IIS process address space (Inetinfo.exe) and is used to support cookie-less session state management.

The IIS metabase can be reviewed at 628. Security and other IIS configuration settings are maintained in the IIS metabase file. The permissions on the IIS metabase (and the backup metabase file) should be hardened to be sure that attackers cannot modify the IIS configuration in any way, for example, to disable authentication for a particular virtual directory.

Server certificates are reviewed at 630. If a web application supports HTTPS (SSL) over port 443, it is important to install a server certificate. It will be understood that this is required as part of the session negotiation process that occurs when a client establishes a secure HTTPS session. A valid certificate provides secure authentication so that a client can trust the server it is communicating with, and secure communication so that sensitive data remains confidential and tamperproof over the network.

Continuing with the methodology of FIG. 6, the machine.config file is reviewed at 632. This act addresses hardening information about machine level settings that apply to all applications. It will be understood that the Machine.config file maintains numerous machine wide settings for the .NET Framework, many of which affect security.

Finally, code access security can be addressed at 634. Those skilled in the art will appreciate that machine level code access security policy is determined by settings in the Security.config file. As such, it is particularly important to address these settings.

The methodology illustrated in FIG. 6 is an overview of securing a web server in accordance with the novel server security schema information model of the innovation. This novel server security model can facilitate determining vulnerabilities, threats, and countermeasures to establish sound security practices. By following the proceeding acts, which can be incorporated into the novel server security schema, a developer can generate an identically configured server, with regard to security.

In summary, a secure web server provides a protected foundation for hosting web applications. The innovation can leverage this expertise into a novel server security schema. By performing the hardening acts in accordance with the schema, a developer can create a secure platform and host infrastructure to support web applications and web services.

Figure 7:
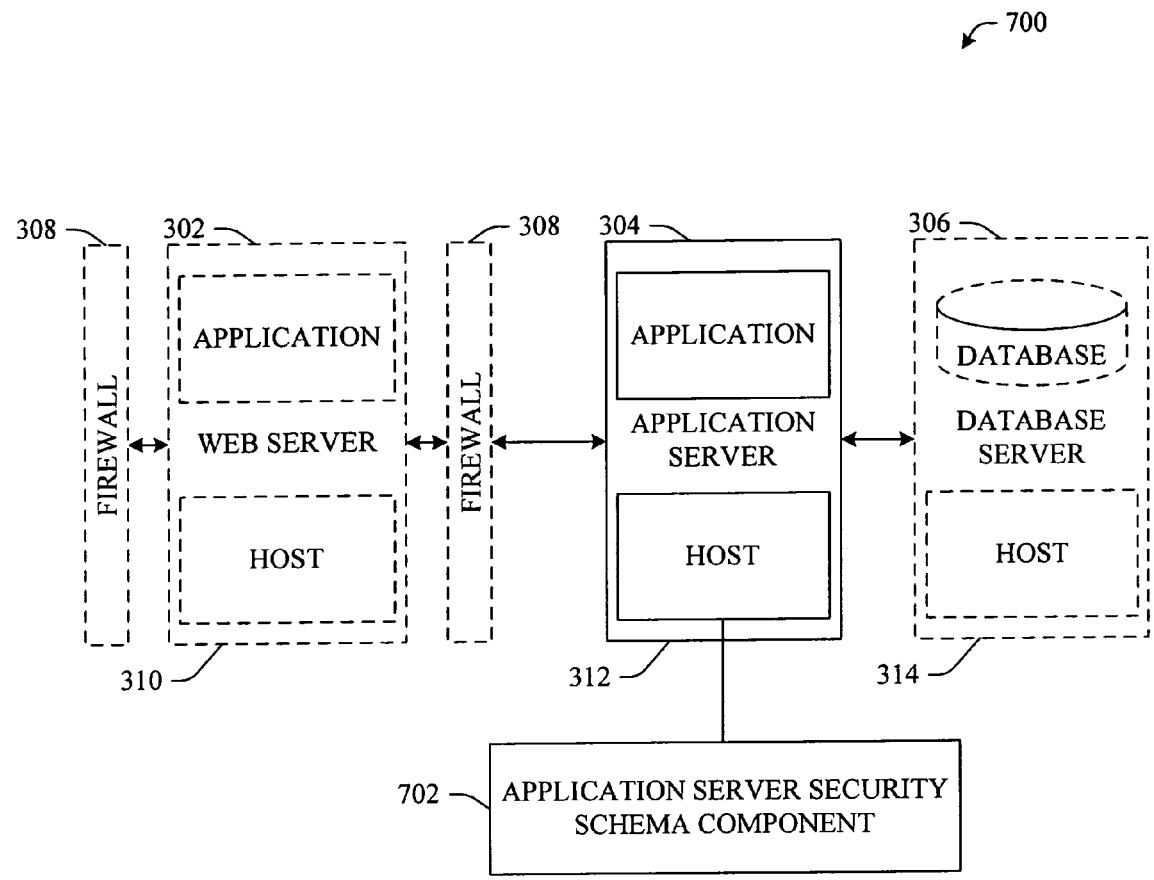
FIG. 7 illustrates an exemplary architecture of an application server system and related application server security schema in accordance with an aspect of the innovation.

Turning now to FIG. 7, an architecture of a system 700 is shown in accordance with an aspect of the innovation. More particularly, in accordance with the system 700, a novel application server security schema component 702 can be employed to leverage expertise with respect to the application server 504. It will be understood that the aforementioned web server security schema 508, the application server schema 702 and the database security schema described infra are all variations of the novel server security schema 104 described with reference to FIG. 1.

The scenario of FIG. 7 illustrates how to secure middle tier application servers (504) that most often host business logic and data access services. This functionality is usually packaged inside Enterprise Services applications or is exposed to front-end web servers 502 by using middle-tier web services technology. Below is a discussion of some of the main threats to an application server 504. These threats are somewhat different from those that apply to an Internet-facing web server 502 because middle-tier application servers 504 are (or should be) isolated from direct Internet access. To secure the application server 504, an incremental security configuration can be applied after the underlying operating system and Internet Information Services (IIS) Web server (if installed) have been locked down. The application server security schema can be employed to bundle this expertise thus enabling consistent and secure development of application servers 504.

Turning now to the threats and countermeasures associated to an application server 504, many threats to an application server 504 come from within an organization because application servers 504 should be isolated from Internet access. Identification of these threats and countermeasures can be facilitated by the novel application server security schema component 702. The main threats to an application server are:
  Network eavesdropping
  Unauthorized access
  Viruses, trojan horses, and worms With respect to network eavesdropping, attackers with network monitoring software can intercept data flowing from the web server 502 to the application server 504 and from the application server 504 to downstream systems and database servers 506. The attacker can view and potentially modify this data.

Vulnerabilities that can make your application server vulnerable to network eavesdropping include:
  Sensitive data transmitted in clear text by the application
  Use of Microsoft SQL Server authentication to the database, resulting in clear text credentials
  Lack of transport or application layer encryption
  Insecure network-hardware administrative interfaces
  Use of the .NET Remoting TCP Channel to remote components The attacker can place packet-sniffing tools on the network to capture traffic.

Countermeasures that prevent packet sniffing include the following:
  Use secure authentication, such as Windows authentication, that does not send passwords over the network.
  Encrypt SQL Server authentication credentials. If the developer uses SQL Server authentication, credentials can be encrypted automatically by installing a server certificate on the database server.
  Secure communication channels. Options include using Secure Sockets Layer (SSL) or Internet Protocol Security (IPSec).
  Use remote procedure call (RPC) encryption with Enterprise Services applications.
  Use a segmented network, which can isolate eavesdropping to compromised segments.
  Use the HttpChannel and SSL with .NET Remoting.

Turning to unauthorized access, if the developer fails to block the ports used by applications that run on the application server 504 at the perimeter firewall, an external attacker can communicate directly with the application server. If computers are allowed other than the front-end web servers 502 to connect to the application server 504, the attack profile for the application server 504 increases.

Vulnerabilities that can result in unauthorized access include:
  Weak perimeter network and firewall configurations
  Superfluous ports open on the internal firewall
  Lack of IPSec policies to restrict host connectivity
  Unnecessary active services
  Unnecessary protocols
  Weak account and password policies Common attacks to gain unauthorized access include:
  Port scanning that detects listening services
  Banner grabbing that gives away available services and possibly software versions
  Malicious application input Password attacks against default accounts with weak passwords Countermeasures to prevent unauthorized access include:
Firewall policies that block all traffic except expected communication ports
TCP/IP filtering or IPSec policies to prevent unauthorized hosts from establishing connections
Disabling unused services
Static DCOM endpoint mapping that allows access only to authorized hosts Turning now to a discussion of viruses, worms, and trojan horses with respect to the application server 504, these attacks are often not noticed until they begin to consume system resources, which slows down or halts the execution of other applications. Application servers 504 that host IIS are susceptible to IIS attacks.

Figure 8:
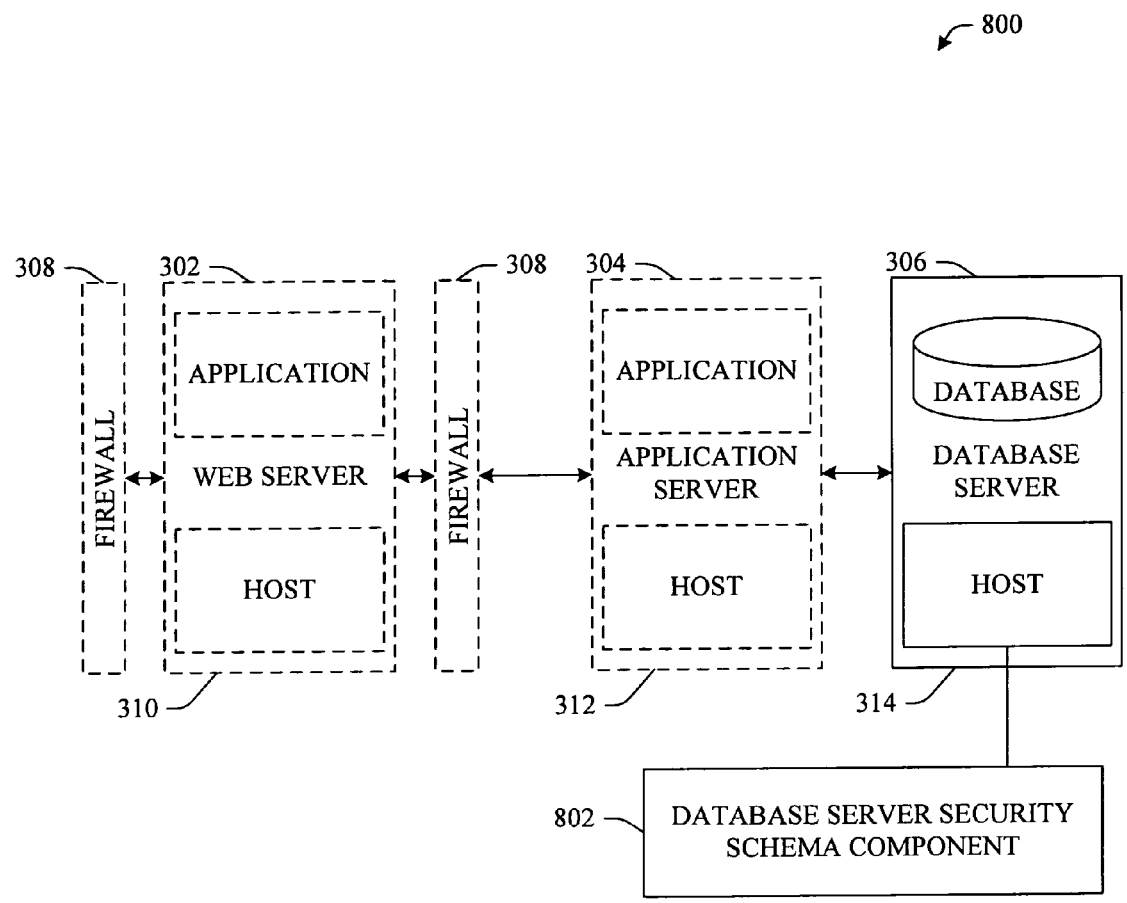
FIG. 8 illustrates an exemplary architecture of a database server system and related database server security schema in accordance with an aspect of the innovation.

Vulnerabilities that can result include:
Unpatched servers
Running unnecessary services
Unnecessary ISAPI filters and ISAPI extensions Countermeasures that help mitigate the risk posed by viruses, trojan horses, and worms include:
Promptly applying the latest software patches
Disabling unused functionality, such as unused ISAPI filters and extensions
Running processes with least privileged accounts to reduce the scope of damage in the event of a compromise FIG. 8 illustrates an architecture of a system 800 that employs a database server security schema component 802 that leverages expertise by establishing an information model that addresses database server security. While this exemplary system 800 focuses on SQL Server database servers (e.g., 506), it will be understood that the novel functionality of the innovation can be applied to any type of database server. The discussion that follows begins by reviewing the most common threats that affect database servers 506 and it then takes a step-by-step approach that shows demonstrate to improve a database server 506 security by applying secure configuration.

There are many ways to attack a database. External attacks can exploit configuration weaknesses that expose the database server 506. An insecure web application can also be used to exploit the database. For example, an application that is granted too much privilege in the database or one that does not validate its input can put a database at risk.

An attacker can target and compromise a database server 506 in a number of ways by exploiting a variety of configuration and application level vulnerabilities.

The main threats to a database server 506 are:
SQL injection
Network eavesdropping
Unauthorized server access
Password cracking With respect to an SQL injection attack, the attacker exploits vulnerabilities in the application's input validation and data access code to run arbitrary commands in the database using the security context of the web application.

Vulnerabilities exploited by SQL injection include:
Poor input validation in web applications
Unsafe, dynamically constructed SQL commands
Over-privileged application logins to the database
Weak permissions that fail to restrict the application's login to the database To counter SQL injection attacks:
The application should constrain and sanitize input data before using it in SQL queries.
Use type safe SQL parameters for data access. These can be used with stored procedures or dynamically constructed SQL command strings. Using SQL parameters ensures that input data is subject to type and length checks and also that injected code is treated as literal data, not as executable statements in the database.
Use a SQL Server login that has restricted permissions in the database. Ideally, the developer should grant execute permissions only to selected stored procedures in the database and provide no direct table access.

Network eavesdropping can be addressed by referring to the deployment architecture of an application that includes a physical separation of the data access code from the database server. As a result, sensitive data, such as application-specific data or database login credentials, must be protected from network eavesdroppers.

Vulnerabilities that increase the likelihood of network eavesdropping include:
Insecure communication channels
Passing credentials in clear text to the database; for example:
Using SQL authentication instead of Windows authentication
Using SQL authentication without a server certificate In order to counter network eavesdropping:
Use Windows authentication to connect to the database server to avoid sending credentials over the network.
Install a server certificate on the database server. This results in the automatic encryption of SQL credentials over the network.
Use an SSL connection between the web server 502 and database server 506 to protect sensitive application data. This requires a database server certificate.
Use an IPSec encrypted channel between web and database server.

Turning now to unauthorized server access, direct access to the database server 506 should be restricted to specific client computers to prevent unauthorized server access.

Vulnerabilities that make a database server 506 susceptible to unauthorized server access include:
Failure to block the SQL Server port at the perimeter firewall
Lack of IPSec or TCP/IP filtering policies Direct connection attacks exist for both authenticated users and those without a user name and password; for example:
Tools such as Query Analyzer (Isqlw.exe) or the command line equivalent (Osql.exe) are used to establish a direct connection to SQL Server and issue commands.
Server information, such as software version, is revealed to an attacker who sends carefully constructed packets to listening ports.

To counter these attacks:
Make sure that SQL Server ports are not visible from outside of the perimeter network.
Within the perimeter, restrict direct access by unauthorized hosts, for example, by using IPSec or TCP/IP filters.

Finally, turning to password cracking, a common first line of attack is to try to crack the passwords of well known account names, such as the SQL Server administrator account.

Common vulnerabilities that lead to password cracking are:
Weak or blank passwords
Passwords that contain everyday words Common password cracking attacks include:
Dictionary attacks
Manual password guessing To counter these attacks:
  Create passwords for SQL Server login accounts that meet complexity requirements.
  Avoid passwords that contain common words found in the dictionary.

Figure 9:
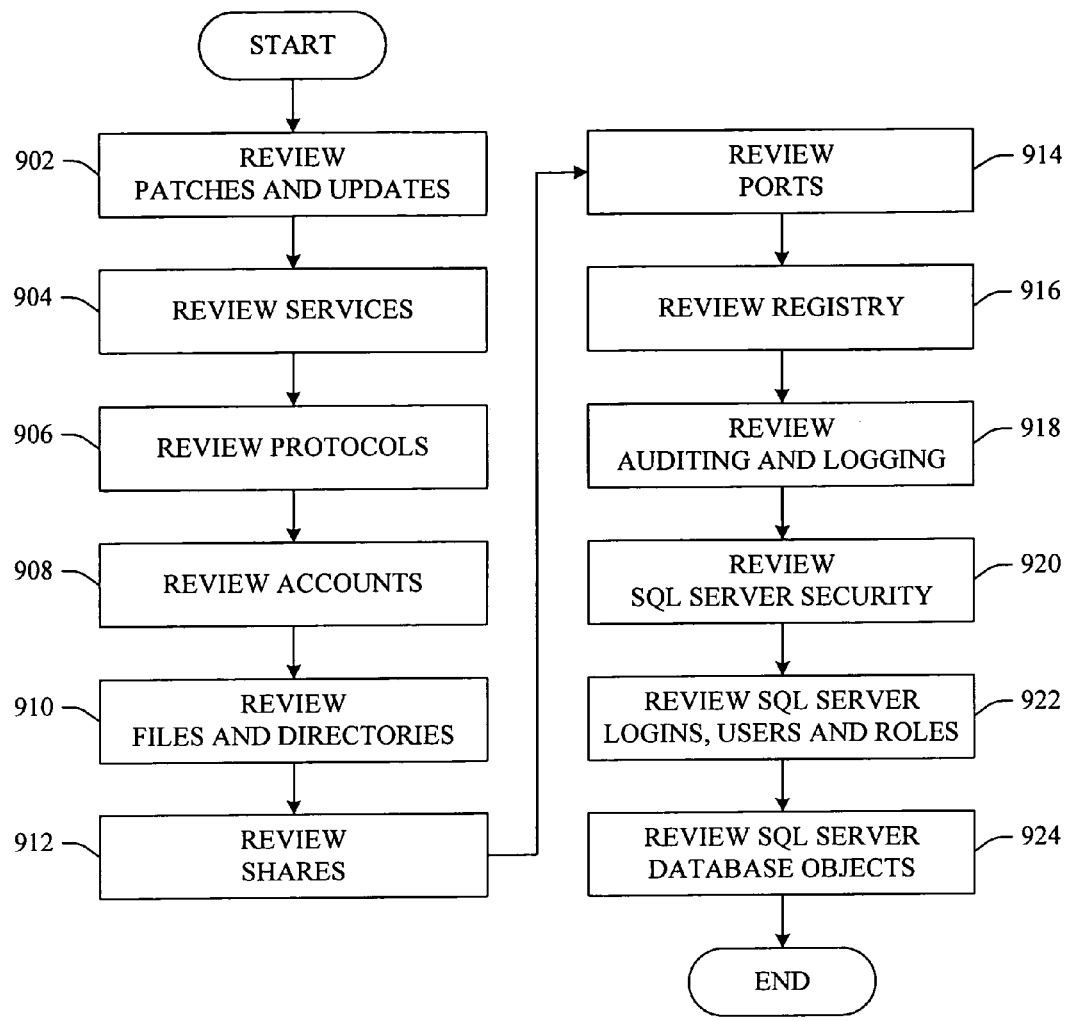
FIG. 9 illustrates an exemplary flow chart of procedures for reviewing database server security in accordance with an aspect of the innovation.

Illustrated in FIG. 9 is an exemplary methodology for securing a database server (e.g., 306) in accordance with an aspect of the innovation. As stated earlier, while specific categories (e.g., patches and updates, services) are described herein, it is to be appreciated that the categories can be modified in order to adhere to a particular server type configurations. These additional aspects are to be included within the scope of this disclosure and claims appended hereto.

For example, securing SQL Server and Windows 2000 can involve many configuration changes. One particularly helpful approach is to separate the changes that must be made into specific configuration categories. Using categories allows a developer to systematically walk through the securing process from top to bottom or to pick a particular category and apply specific steps. As illustrated in FIG. 9, the exemplary database server securing methodology has been organized into the categories.

As described above, the configuration categories which can be incorporated into a database server security schema are based on a best practices approach obtained from field experience, customer validation, and the study of secure deployments. In other words, expertise is leveraged into the rationale behind the categories described in FIG. 2. Following is a brief discussion of each of these categories as they relate to a database server security schema.

Patches and updates—Many security threats exist because of vulnerabilities in operating systems, services, and applications that are widely published and well known. When new vulnerabilities are discovered, attack code is frequently posted on Internet bulletin boards within hours of the first successful attack. Patching and updating a server's software is a first step toward securing a database server. It will be appreciated that there may be cases where a vulnerability exists and no patch is known or available. In these cases, the developer should be aware of the details of the vulnerability to assess the risk of attack and take measures accordingly.

Services—Services are prime vulnerability points for attackers who can exploit the privileges and capabilities of the service to access the server and potentially other computers. Some services are designed to run with privileged accounts. If these services are compromised, the attacker can perform privileged operations. By default, database servers generally do not need all services enabled. By disabling unnecessary and unused services, developers can quickly and easily reduce the attack surface area.

Protocols—Limit the range of protocols that client computers can use to connect to the database server and make sure those protocols can be secured.

Accounts—It is prudent to restrict the number of accounts accessible from the database server to the necessary set of service and user accounts. Moreover, it can be helpful to use least privileged accounts with strong passwords in all cases. A least privileged account used to run SQL Server can limit the capabilities of an attacker who compromises SQL Server and manages to execute operating system commands.

Files and directories—Use file system permissions to protect program, database, and log files from unauthorized access. When ACLs are used in conjunction with auditing, it is possible to detect when suspicious or unauthorized activity occurs.

Shares—Remove all unnecessary file shares, including the default administration shares if they are not required. Any remaining shares with restricted permissions should be secured. Although shares may not be directly exposed to the Internet, a defense in depth strategy with limited and secured shares can reduce (or eliminate) risk if a server is compromised.

Ports—Unused ports are closed at the firewall, but it is required that servers behind the firewall also block or restrict ports based on their usage. For a dedicated SQL Server, all ports except for the necessary SQL Server port and the ports required for authentication should be blocked.

Registry—SQL Server maintains a number of security-related settings, including the configured authentication mode in the registry. Access to the registry to prevent the unauthorized update of configuration settings should be restricted and controlled, for example, to loosen security on the database server.

Auditing and logging—Auditing is a vital aid in identifying intruders, attacks in progress, and to diagnose attack footprints. As such, at least a minimum level of auditing for the database server using a combination of Windows and SQL Server auditing features should be configured.

SQL server security—A number of SQL Server security settings can be controlled through Enterprise Manager. These settings can include the authentication mode, auditing level, and the accounts used to run the SQL Server service. For improved security, a developer should use the operating system authentication. Furthermore, SQL Server logon auditing should be enabled and the developer should ensure that the SQL Server service runs using a least privileged account.

SQL server logins, users, and roles—In one aspect, SQL Server 2000 manages access control using logins, databases, users, and roles. Users (and applications) can be granted access to SQL Server by way of a SQL server login. The login is associated with a database user and the database user is placed in one or more roles. The permissions granted to the role can determine the tables the login can access and the types of operations the login can perform. In an aspect, this approach is used to create least privileged database accounts that have the minimum set of permissions necessary to allow them to perform their legitimate functionality.

SQL server database objects—The ability to access SQL Server database objects, such as built-in stored procedures, extended stored procedures and cmdExec jobs, should be reviewed. Also, any sample databases should be deleted.

Referring again to FIG. 9, a methodology for securing a database server is shown. While specific categories of review are shown and described herein, it is to be understood that the specific categories can vary based upon the type of database server used. These alternative aspects are to be included within the scope of this disclosure and claims appended hereto. The exemplary methodology of FIG. 9 describes a process of securing a database server using the aforementioned configuration categories. As such, this exemplary methodology covers Windows 2000 and SQL Server 2000 implementations. It is to be understood and appreciated that each step can contain one or more actions to secure a particular area or feature.

In an initial step, at 902, patches and updates can be reviewed. Failure to apply the latest patches and updates in a timely manner can provide opportunities for attackers to exploit known vulnerabilities. For example, it can be important to verify that the database server is updated with the latest Windows 2000 and SQL Server service packs and updates. In operation, it can be helpful to test patches and updates on test systems that mirror production servers as closely as possible before applying them on production servers.

At 904, services can be reviewed. In order to reduce the attack surface area and to make sure that the server is not affected by undiscovered service vulnerabilities, any service that is not required should be disabled. As well, remaining services should be run using least privileged accounts.

At 906, protocols are reviewed. By preventing the use of unnecessary protocols, the surface area of attack can be reduced. By way of example, in an aspect, the developer can configure an SQL server to support only clients that connect using the TCP/IP protocol. As well, the developer should disable all other protocols, unless required.

Accounts should be reviewed at 908. In the act, the developer can follow the principle of least privilege for the accounts used to run and connect to SQL Server to restrict the capabilities of an attacker who manages to execute SQL commands on the database server. As well, the developer should also apply strong password policies to counter the threat of dictionary attacks.

A review of files and directories can be employed at 910. More particularly, in addition to securing operating system files using ACLs, the developer can harden permissions to restrict access to SQL server program files, data files, and log files together with system level tools. Additionally, the SQL server service account should have access only to what it needs to operate.

Shares are reviewed and addressed at 912. In particular, a developer should remove any unused shares and harden the permissions on any required shares. By default, all users can have full control on newly created file shares. Thus, it is important to harden these default permissions to make sure that only authorized users can access files exposed by the share. Also, ACLs on files and folders exposed by the share in addition to explicit share permissions should be used.

In a next act, ports can be reviewed at 914. By default, in an aspect, an SQL server listens on TCP port 1433 and uses UDP port 1434 for client-server negotiation. As such, a combination of firewalls and IPSec policies can be employed to restrict access to these ports to minimize the avenues of attack open to an attacker.

At 916, the registry can be reviewed and addressed. Continuing with the example, when SQL server is installed, it creates a number of registry entries and subentries that maintain vital system configuration settings. It is particularly important to secure these settings to prevent an attacker from changing them to compromise the security of your SQL server installation.

Auditing and logging can be reviewed and addressed at 918. It is to be understood that auditing does not always prevent system attacks, although it is a vital aid in identifying intruders, attacks in progress, and to diagnose attack footprints. It is important to enable all auditing mechanisms at the developer's disposal, including operating system level auditing and SQL server login auditing. SQL server also supports C2 level extended auditing. This may be required in specific application scenarios, where auditing requirements are stringent. These specific application scenarios are to be included within the scope of this disclosure and claims appended hereto.

In a particular aspect, SQL server security can be reviewed at 920. For example, the settings discussed in this methodology can be configured using the Security tab of the SQL Server Properties dialog box in Enterprise Manager. As well, the settings can apply to all the databases in a single instance of SQL Server.

Continuing with the SQL database server example, at 922, the SQL server logins, users, and roles can be reviewed and addressed. It will be understood that, in most cases, in order to be able to access objects in a database, two layers of security checks are passed. First, a user presents a valid set of login credentials to SQL Server. If Windows authentication is used, it will be necessary to connect using a Windows account that has been granted a SQL Server login. In another example, if SQL server authentication is used, the user supplies a valid user name and password combination. Thereafter, the login grants access to SQL Server.

In order to access a database, the login must be associated with a database user inside the database for which connection is desired. If the login is associated with a database user, the capabilities of the login inside the database are determined by the permissions associated with that user. If a login is not associated with a specific database user, the capabilities of the login are determined by the permissions granted to the public role in the database. All valid logins are associated with the public role, which is present in every database and cannot be deleted. By default, the public role within any database that is created is not granted any permissions.

In a final exemplary act, SQL server database objects can be reviewed. It is to be understood that SQL server provides two sample databases for development and education together with a series of built-in stored procedures and extended stored procedures. The sample databases should not be installed on production servers and powerful stored procedures and extended stored procedures should be secured.

In a particular aspect of the innovation, an artificial intelligence (AI) component can be employed which facilitates automating one or more features in accordance with the subject innovation. The subject innovation (e.g., determining a server type, categories, threats, etc.) can employ various AI-based schemes for carrying out various aspects thereof. For example, a process for determining a set of threats, vulnerabilities and/or countermeasures can be facilitated via an automatic classifier system and process.

A classifier is a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria selecting a set of threats, vulnerabilities and/or countermeasures. By way of further example, it will be understood that a particular developer can be routinely more cautious in certain development areas. As such, the system can learn these areas and develop an appropriate server security schema that adheres to the server type taking into consideration a user preference.

Figure 10:
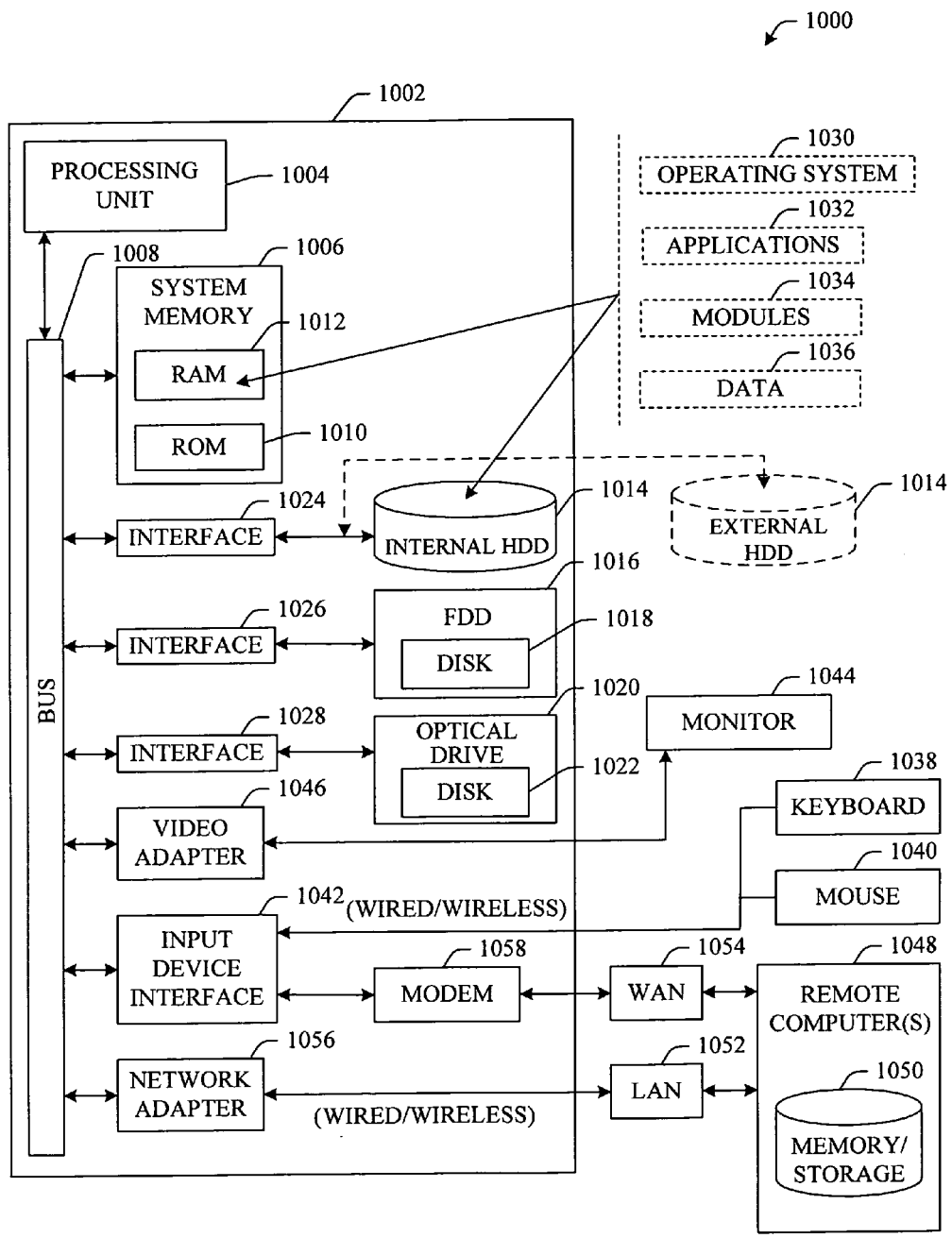
FIG. 10 illustrates a block diagram of a computer operable to execute the disclosed architecture.

Referring now to FIG. 10, there is illustrated a block diagram of a computer operable to execute the disclosed architecture of configuring and enabling implementation of a server security schema in accordance with an aspect of the innovation. In order to provide additional context for various aspects of the subject innovation, FIG. 10 and the following discussion are intended to provide a brief, general description of a suitable computing environment 1000 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the innovation includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the innovation can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
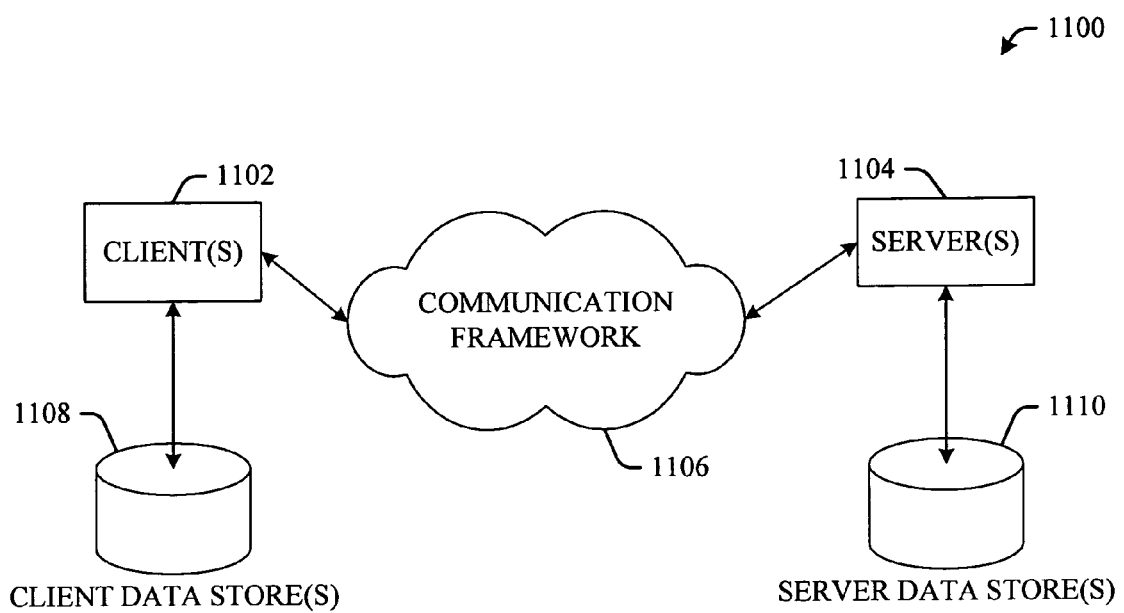
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject innovation. The system 1100 includes one or more client(s) 1102. The client(s) 1102 can be hardware and/or software (e.g., threads, processes, computing devices). The client(s) 1102 can house cookie(s) and/or associated contextual information by employing the innovation, for example.

The system 1100 also includes one or more server(s) 1104. The server(s) 1104 can also be hardware and/or software (e.g., threads, processes, computing devices). The servers 1104 can house threads to perform transformations by employing the innovation, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates organizing server security-related information into a format readily usable by a user developing a server, the system comprising a computer having a processor and memory storing:

a server security schema configuration component that facilitates identification of expertise related to the server security-related information and that provides organizational information;

a server security schema component that is a pattern-based information model that groups the server security-related information and the expertise related to the server security-related information into a structure, the server security schema component comprising:

a plurality of server security-related categories associated with the server that are customized to a particular server type of the server, the plurality of server security-related categories identifying areas where security issues exist for the particular server type of the server, a plurality of vulnerability components, wherein each of the plurality of server security-related categories has at least one vulnerability component associated with it, the plurality of vulnerability components describing weaknesses that make attacks possible for the associated security-related category, a plurality of threat/attack components, wherein each of the plurality of vulnerability components has at least one threat/attack component associated with it, each of the plurality of threat/attack components referring to at least a threat or an attack, the threat describing an undesired event or a potential occurrence that may harm or compromise an asset, the attack describing an action taken that utilizes one or more vulnerabilities to realize a threat, and a plurality of countermeasure components, wherein each of the plurality of threat/attack components has at least one countermeasure component associated with it, the plurality of countermeasure components describing safeguards that address attacks or mitigate risks;

wherein the structure of the server security schema component is based on the organizational information and associations; and wherein the security schema component, plurality of server security-related categories, plurality of vulnerability components, plurality of threat/attack components, and plurality of countermeasure components are used in developing a server of the particular server type.

2. The system of claim 1, wherein the plurality of security-related categories includes a share, a service, an account, an audit and log, a file and directory, a registry, a protocol, a port, and a patch and update category.

3. The system of claim 1, wherein the plurality of security-related categories includes at least one of an operating system category, a network category and a patch and update category.

4. The system of claim 1, wherein the plurality of security-related categories includes a share, a service, an account, an audit and log, a file and directory, and registry category.

5. The system of claim 1, wherein the plurality of security-related categories includes a protocol and a port category.

6. The system of claim 1, wherein the plurality of security-related categories includes a patch and update category.

7. The system of claim 1, wherein the server type of the server is a web server.

8. The system of claim 1, wherein the server type of the server is an application server.

9. The system of claim 1, wherein the server type of the server is a database server.

10. The system of claim 1, further comprising an artificial intelligence (AI) component that facilitates identifying the expertise based at least in part upon a machine learning mechanism.

11. A method implemented within a computing system that includes a processor and memory storing instructions which, when executed by the processor, implement the method of organizing expertise and server security-related information into a format readily usable by a user developing a server, the method comprising:

identifying a plurality of server security-related categories associated with the server that are customized to a particular server type of the server, the plurality of server security-related categories identifying areas where security issues exist for the particular server type of the server;

identifying a plurality of vulnerability components, each of the plurality of vulnerability components describing weaknesses that make attacks possible for a corresponding at least one of the plurality of server security-related categories;

associating each of the plurality of vulnerability components with the corresponding at least one of the plurality of server security-related categories;

identifying a plurality of threat/attack components, each of the plurality of threat/attack components referring to at least a threat or an attack, the threat describing an undesired event or a potential occurrence that may harm or compromise an asset, the attack describing an action taken that utilizes one or more vulnerabilities to realize a threat;

associating each of the plurality of threat/attack components with at least one of the plurality of vulnerability components;

identifying a plurality of countermeasure components, the plurality of countermeasure components describing safeguards that address attacks or mitigate risks;

associating each of the plurality of countermeasure components with at least one of the plurality of threat/risk components;

providing organizational information; and grouping the expertise, the security related information, the plurality of server-security related categories, the plurality of vulnerability components, the plurality of threat/attack components, and the plurality of countermeasure components into a pattern-based information model in a structure, the structure being dictated by the organizational information and associations, and which is usable in developing a server of the particular server type.

12. The computer implemented method of claim 11, the plurality of server security-related categories is at least one of a share, a service, an account, an audit and log, a file and directory, a registry, a protocol, a port, and a patch and update category.

13. The computer-implemented method of claim 11, wherein the server type of the server is a web server.

14. The computer-implemented method of claim 11, wherein the server type of the server is an application server.

15. The computer-implemented method of claim 11, wherein the server type of the server is a database server.

16. A computer storage medium storing computer-executable instructions that, when implemented, perform the method recited in claim 11.

17. The computer-executable instructions of claim 16, wherein the server is one of an application server, a web server or a database server.

18. The computer-executable instructions of claim 16, wherein the plurality of server-security related categories includes at least one of a share, a service, an account, an audit and log, a file and directory, a registry, a protocol, a port, and a patch and update category.

19. The method of claim 13, wherein the plurality of security-related categories includes at least one of a sites and virtual directories category, a script mapping category, a filters category, a configuration settings category, and a code access security category.

20. The method of claim 15, wherein the plurality of security-related categories includes at least one of a SQL server security category; a SQL server logins, users, and roles category; and a SQL server database objects category.

* * * * *